(12) United States Patent
Froy, Jr.

(10) Patent No.: US 11,869,298 B2
(45) Date of Patent: Jan. 9, 2024

(54) ELECTRONIC GAMING MACHINES AND ELECTRONIC GAMES USING MIXED REALITY HEADSETS

(71) Applicant: IGT, Las Vegas, NV (US)

(72) Inventor: David Vincent Froy, Jr., Lakeville-Westmorland (CA)

(73) Assignee: IGT, Las Vegas, NV (US)

( * ) Notice: Subject to any disclaimer, the term of this patent is extended or adjusted under 35 U.S.C. 154(b) by 452 days.

(21) Appl. No.: 16/984,278

(22) Filed: Aug. 4, 2020

(65) Prior Publication Data
US 2021/0012609 A1 Jan. 14, 2021

Related U.S. Application Data

(63) Continuation of application No. 15/705,376, filed on Sep. 15, 2017, now abandoned.

(60) Provisional application No. 62/399,121, filed on Sep. 23, 2016.

(51) Int. Cl.
G07F 17/00 (2006.01)
G07F 17/32 (2006.01)
G06F 3/147 (2006.01)
G02B 27/01 (2006.01)
G06F 3/14 (2006.01)
G09G 3/00 (2006.01)
G06F 3/16 (2006.01)
G06T 19/00 (2011.01)

(52) U.S. Cl.
CPC ..... *G07F 17/3213* (2013.01); *G02B 27/0172* (2013.01); *G06F 3/147* (2013.01); *G06F 3/1423* (2013.01); *G07F 17/3209* (2013.01); *G07F 17/3225* (2013.01); *G07F 17/3246* (2013.01); *G07F 17/3251* (2013.01); *G07F 17/3267* (2013.01); *G02B 2027/014* (2013.01); *G02B 2027/0138* (2013.01); *G02B 2027/0141* (2013.01); *G02B 2027/0187* (2013.01); *G06F 3/167* (2013.01); *G06T 19/006* (2013.01); *G09G 3/003* (2013.01); *G09G 2354/00* (2013.01); *G09G 2370/022* (2013.01); *G09G 2370/16* (2013.01)

(58) Field of Classification Search
CPC ......... G07F 17/3213; G07F 9/00; G07F 9/001
See application file for complete search history.

(56) References Cited

U.S. PATENT DOCUMENTS 8,235,529 B1   8/2012  Raffle
8,558,759 B1  10/2013  Prada
8,608,550 B1 * 12/2013  Gagner ............... G07F 17/3211
                                                         463/25

(Continued)

*Primary Examiner* — James S. McClellan
*Assistant Examiner* — Jeffrey K Wong
(74) *Attorney, Agent, or Firm* — Sage Patent Group

(57) ABSTRACT

A method of interacting with an electronic gaming machine that executes a program for a wagering game includes generating a video image including the electronic gaming machine, the electronic gaming machine is within a view of a player, generating virtual content associated with the game executed by the electronic gaming machine, and displaying the virtual content to the player to augment the player's view of the electronic gaming machine, the virtual content appears to the player to be on or adjacent to the electronic gaming machine. Related electronic gaming machines and electronic gaming systems are also disclosed.

19 Claims, 23 Drawing Sheets

(56) References Cited

U.S. PATENT DOCUMENTS

| | | | |
|---|---|---|---|
| 8,943,420 B2 | 1/2015 | Goldthwaite | |
| 9,280,867 B2 | 3/2016 | Froy | |
| 9,280,868 B2 | 3/2016 | Froy | |
| 9,285,592 B2 | 3/2016 | Olsson | |
| 9,412,201 B2 | 8/2016 | Kinnebrew | |
| 9,558,620 B2 | 1/2017 | Froy | |
| 9,569,920 B2 | 2/2017 | Froy | |
| 2009/0106670 A1* | 4/2009 | Berndt | H04L 12/1822 715/757 |
| 2009/0305770 A1* | 12/2009 | Bennett | G07F 17/32 463/20 |
| 2010/0177172 A1* | 7/2010 | Ko | H04N 13/354 463/32 |
| 2011/0117987 A1* | 5/2011 | Aoki | G07F 17/32 463/20 |
| 2011/0244952 A1* | 10/2011 | Schueller | G07F 17/3262 463/31 |
| 2012/0122546 A1* | 5/2012 | Lange | G07F 17/3213 463/20 |
| 2013/0331184 A1* | 12/2013 | Kelly | G07F 17/3211 463/31 |
| 2014/0121015 A1 | 5/2014 | Massing | |
| 2014/0168261 A1 | 6/2014 | Margolis | |
| 2014/0364199 A1* | 12/2014 | Baerlocher | G07F 17/3244 463/25 |
| 2015/0065219 A1* | 3/2015 | Kiely | G07F 17/3246 463/31 |
| 2015/0087403 A1 | 3/2015 | Castro | |
| 2015/0126279 A1 | 5/2015 | Lyons | |
| 2016/0189477 A1 | 6/2016 | Harris | |
| 2016/0373570 A1 | 12/2016 | Scavezze | |

\* cited by examiner

ELECTRONIC GAMING MACHINES AND ELECTRONIC GAMES USING MIXED REALITY HEADSETS

RELATED APPLICATIONS

This application is a continuation of, and claims priority to and the benefit of, U.S. patent application Ser. No. 15/705,376, which was filed Sep. 15, 2017, which claims the benefit of and priority to U.S. Provisional Patent Application No. 62/399,121, filed Sep. 23, 2016, entitled "ELECTRONIC GAMING MACHINES AND ELECTRONIC GAMES USING MIXED REALITY HEADSETS," the disclosure of which is hereby incorporated herein by reference in its entirety.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Electronic and electro-mechanical gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. Manufacturers of EGMs have incorporated a number of enhancements to the EGMs to allow players to interact with the EGMs in new and more engaging ways. For example, early slot machines allowed player interaction by pulling a lever or arm on the machine. As mechanical slot machines were replaced by electronic slot machines, a range of new player interface devices became available to EGM designers and were subsequently incorporated into EGMs. Examples of such interface devices include electronic buttons, wheels, and, more recently, touchscreens and three dimensional display screens.

SUMMARY

A method of interacting with an electronic gaming machine that executes a program for a wagering game is provided. The method includes generating a video image including the electronic gaming machine, the electronic gaming machine is within a view of a player, generating virtual content associated with the game executed by the electronic gaming machine, and displaying the virtual content to the player to augment the player's view of the electronic gaming machine, the virtual content appears to the player to be on or adjacent to the electronic gaming machine.

The electronic gaming machine may include a video display screen, and the method may further include displaying at least one symbol on the video display screen, the symbol includes a first game element of the wagering game, and the virtual content includes at least a second symbol that includes a second game element of the wagering game, determining an outcome of the wagering game based on the first game element and the second game element, and awarding a prize to the player based on the outcome of the wagering game.

The electronic gaming machine may include a video display screen and the wagering game may include a base wagering game, and the method may further include displaying game elements of the base wagering game on the video display screen, determining an outcome of the base wagering game, and presenting a bonus game to the player in response to an outcome of the base wagering game. The virtual content may include at least one game element of the bonus game.

The game elements of the base wagering game may include two dimensional content, and the virtual content may include three dimensional content.

The virtual content may include a virtual avatar that appears to the player to be separate from the electronic gaming machine.

The method may further include displaying the wagering game on the electronic gaming machine. The virtual avatar may interact with a game action of the wagering game.

The game action may include spinning of a reel so that the reel comes to rest at a first location, and the virtual avatar may interact with the game action by nudging the reel to a second location after the reel has come to rest at the first location.

The reel may include a virtual reel that is displayed to the player as part of the virtual content. In some embodiments, the reel may include a mechanical reel.

The electronic gaming machine may include a video display screen, and the reel may include a virtual reel displayed on the video display screen.

The method may further include receiving a voice command from the player, and causing the virtual avatar to react to the voice command. The method may further include causing the virtual avatar to carry out the voice command.

The electronic gaming machine may include a primary display screen and a secondary display screen, and the method may further include displaying the virtual content to the player as three dimensional content that appears over the primary display screen, and displaying the virtual content as two dimensional content on the secondary display screen.

Displaying the virtual content to the player may include rendering the virtual content on a mixed reality viewing device operated by the player.

The method may further include displaying the virtual content to an observer of the wagering game on a mixed reality device operated by the observer simultaneously with displaying the virtual content to the player.

The virtual content may include first virtual content, and the method may further include displaying second virtual content that is different from the first virtual content to an observer of the wagering game.

Displaying the first virtual content to the player may include rendering the first virtual content on a first mixed reality viewing device operated by the player and displaying the second virtual content to the observer may include rendering the second virtual content on a second mixed reality viewing device operated by the observer.

The method may further include receiving a voice command from the player, and displaying the virtual content in response to the voice command.

An electronic gaming machine according to some embodiments includes a processor, and a memory storing non-transitory computer program instructions that cause the processor to perform operations including executing a game program, generating virtual content associated with the game program, and transmitting the virtual content for display to a player of the electronic gaming machine to overlay and augment the player's view of the electronic gaming machine, the virtual content appears to the player to be on or adjacent to the electronic gaming machine.

An electronic gaming system according to some embodiments includes an electronic gaming machine including a processor and a memory, and a mixed reality viewing device that is operable by a player of the electronic gaming machine. The electronic gaming machine executes a gaming program, generates generating virtual content associated with the game program, and transmits the virtual content for display to the mixed reality viewing device, and the mixed reality viewing device displays the virtual content to a player of the electronic gaming machine to overlay and augment the player's view of the electronic gaming machine. The virtual content appears to the player to be on or adjacent to the electronic gaming machine.

DETAILED DESCRIPTION

Figure 1:
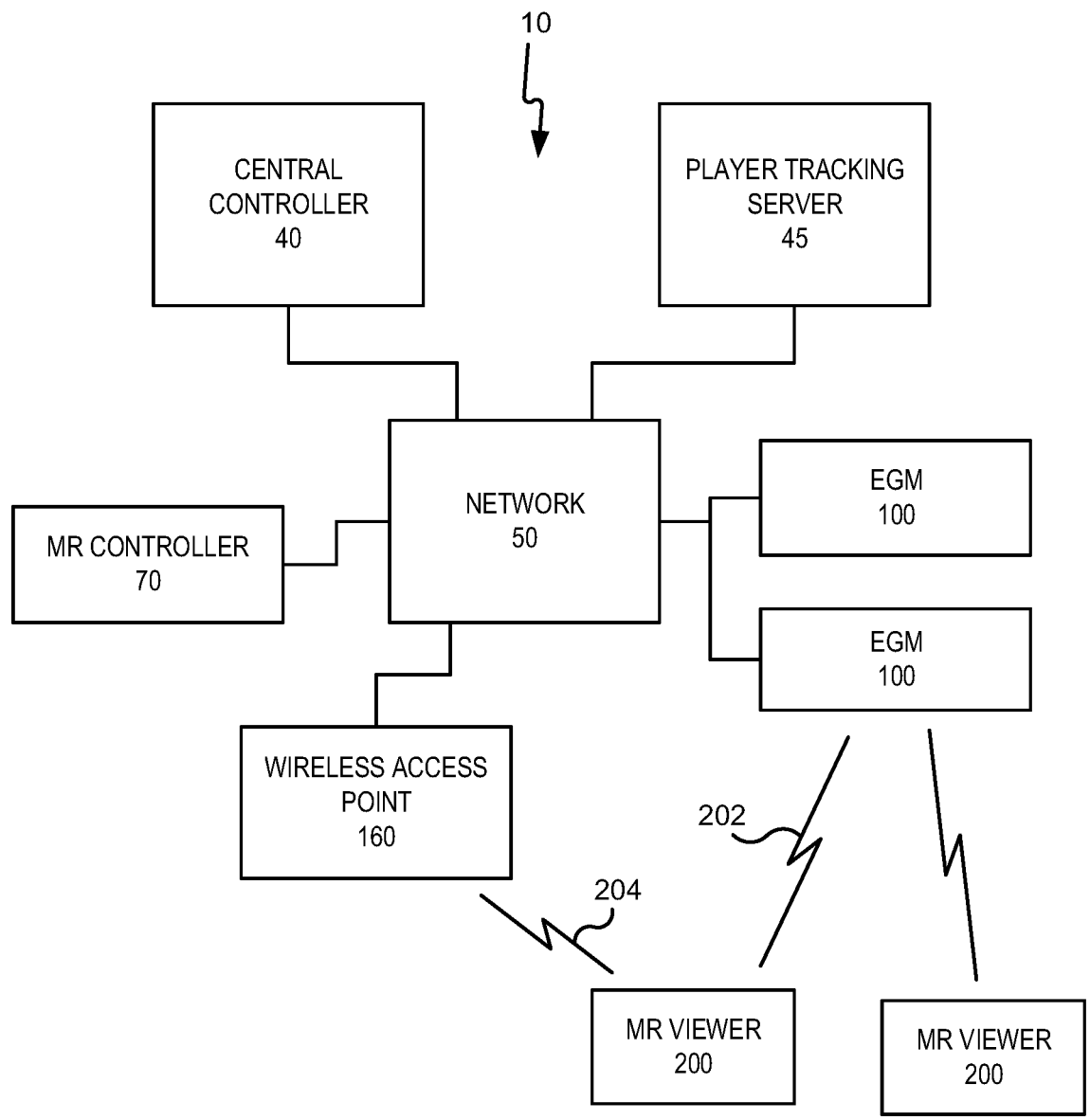
FIG. 1 is a schematic block diagram illustrating a network configuration for a plurality of gaming devices according to some embodiments.

Embodiments of the inventive concepts provide systems and methods for displaying three-dimensional content on or in connection with an electronic gaming machine (EGM), or even independently from an EGM, to a player of an EGM or an observer (non-player) who is watching a player play an EGM. The three dimensional content may be associated with two-dimensional content that is displayed on the EGM. Various embodiments provide systems in which three-dimensional (3D) content is not only displayed to a player, but also interacts with two-dimensional (2D) content displayed on the EGM. According to various embodiments, the 3D content can be rendered to the player on a mixed reality viewer, such as a mixed reality headset that communicates with the EGM so that the 3D content displayed to the player on the mixed reality headset is coordinated with the 2D content displayed on the EGM.

Some embodiments provide a headset display with pass through mixed reality rendering and which supports room scanning to generate a 3D model of an area around a user of the headset. The 3D model and 3D scanner can be used to track and locate objects, such as a user, a user's hand, EGMs, etc., within an area, such as a casino floor. The headset display allows the user to see 3D virtual objects that appear to be physically present in the real world. The headset display also allows the user move around while 3D rendered virtual objects appear to stay in place.

The headset display may be operated in conjunction with an EGM that allows the user to play games of chance. In particular, the headset display may display content generated by the EGM as virtual objects while simultaneously allowing the user to see the EGM, including content displayed by the EGM.

In particular embodiments described below, the EGM may connect over a wireless or other network to the mixed reality headset, and the two may communicate and share information with one another over the network.

In one configuration, the EGM includes a single physical display screen. The mixed reality headset may display a virtual second screen to the player in relation to the main screen. For example, the virtual second screen may be displayed to the user above, below, beside or in front of the physical display screen. Two- or three dimensional content may be displayed to the virtual second screen. Both the physical and virtual screens may display content that is related to gameplay. For example, bonus games could be initiated on the physical display screen and played out on the virtual screen.

In another configuration, a traditional dual screen gaming terminal including a first display screen and a second display screen may be used by the player together with the mixed reality headset. However, some elements of the first and/or second display screen may be left blank and may be rendered by the mixed reality headset. A variety of three dimensional effects can thereby be generated. For example, when the player wins a game, 3D content could come off the first and/or second display screen and celebrate a win with the user. In some embodiments, two dimensional content displayed on the first and/or second display screen may appear to leap out of the screen as a virtual three-dimensional content upon the occurrence of a triggering event.

These and other embodiments are described in more detail below.

Mixed Reality EGM Systems and Viewers

Referring to FIG. 1, a gaming system 10 including a plurality of EGMs 100 is illustrated. The gaming system 10 may be located, for example, on the premises of a gaming establishment, such as a casino. The EGMs 10, which are typically situated on a casino floor, may be in communication with each other and/or at least one central controller 40 through a data network or remote communication link 50. The data network 50 may be a private data communication network that is operated, for example, by the gaming facility that operates the EGM 100. Communications over the data network 50 may be encrypted for security. The central controller 40 may be any suitable server or computing device which includes at least one processor and at least one memory or storage device. Each EGM 100 may include a processor that transmits and receives events, messages, commands or any other suitable data or signal between the EGM 100 and the central controller 40. The EGM processor is operable to execute such communicated events, messages or commands in conjunction with the operation of the EGM. Moreover, the processor of the central controller 40 is designed to transmit and receive events, messages, commands or any other suitable data or signal between the central controller 40 and each of the individual EGMs 100. The central controller 40 is operable to execute such communicated events, messages or commands in conjunction with the operation of the central server. In some embodiments, one or more of the functions of the central controller 40 may be performed by one or more EGM processors. Moreover, in some embodiments, one or more of the functions of one or more EGM processors as disclosed herein may be performed by the central controller 40.

A wireless access point 160 provides wireless access to the network 50. The wireless access point 160 may be connected to the network 50 as illustrated in FIG. 1, or may be connected directly to the central controller 40 or another server connected to the network 50.

A player tracking server 45 may also be connected through the data network 50. The player tracking server 45 may manage a player tracking account that tracks the player's gameplay and spending, manages loyalty awards for the player, manages funds deposited or advanced on behalf of the player, and other functions.

As further illustrated in FIG. 1, a mixed reality viewer 200, or MR viewer 200, is provided. The MR viewer 200 communicates with one or more elements of the system 10 to render two dimensional (2D) and/or three dimensional (3D) content to a player of one of the EGMs 100 in a virtual space, while at the same time allowing the player to see the real space around the player. That is, the MR viewer 200 combines a virtual image with real images perceived by the user, including images of real objects as well as images displayed by the EGM 100. In this manner, the MR viewer 200 "mixes" real and virtual reality into a single viewing experience for the player. In some embodiments, the MR viewer 200 may be further configured to enable the player to interact with both the real and virtual objects displayed to the player by the MR viewer 200.

The MR viewer 200 communicates with one or more elements of the system 10 to coordinate the rendering of mixed reality images, and in some embodiments mixed reality 3D images, to the player. For example, in some embodiments, the MR viewer 200 may communicate directly with an EGM 100 over a wireless link 202, which may be a WiFi link, a Bluetooth link, an NFC link, etc. In other embodiments, the MR viewer 200 may communicate with the network 50 (and devices connected thereto, including EGMs) over a wireless link 204 with the wireless access point 160. The wireless link 204 may include a WiFi link, a Bluetooth link, an NFC link, etc. In still further embodiments, the MR viewer 200 may communicate simultaneously with both the EGM 100 over the wireless link 202 and the wireless access point 160 over the wireless link 204. In these embodiments, the wireless link 202 and the wireless link 204 may use different communication protocols and/or different communication resources, such as different frequencies, time slots, spreading codes, etc. For example, in some embodiments, the wireless link 202 may be a Bluetooth link, while the wireless link 204 may be a WiFi link.

The wireless links 202, 204 allow the MR viewer 200 to coordinate the generation and rendering of mixed reality images to the player via the MR viewer 200.

In some embodiments, the gaming system 10 includes a mixed reality controller, or MR controller, 70. The MR controller 70 may be a computing system that communicates through the network 50 with the EGMs 100 and the MR viewers 200 to coordinate the generation and rendering of virtual images to one or more players using the MR viewers 200. The MR controller 70 may be implemented within or separately from the central controller 40.

In some embodiments, the MR controller 70 may coordinate the generation and display of the virtual images of the same virtual object to more than one player by more than one MR viewer 200. As described in more detail below, this may enable multiple players to interact with the same virtual object together in real time. This feature can be used to provide a shared multiplayer experience to multiple players at the same time.

Moreover, in some embodiments, the MR controller 70 may coordinate the generation and display of the same virtual object to players at different physical locations, as will be described in more detail below.

The MR controller 70 may store a three dimensional wireframe map of a gaming area, such as a casino floor, and may provide the three dimensional wireframe maps to the MR viewers 200. The wireframe map may store various information about EGMs in the gaming area, such as the identity, type and location of various types of EGMs. The three dimensional wireframe map may enable an MR viewer 200 to more quickly and accurately determine its position and/or orientation within the gaming area, and also may enable the MR viewer 200 to assist the player in navigating the gaming area while using the MR viewer 200. Generation of three dimensional wireframe maps is described in more detail below.

In some embodiments, at least some processing of virtual images and/or objects that are rendered by the MR viewers 200 may be performed by the MR controller 70, thereby offloading at least some processing requirements from the MR viewers 200.

Referring to FIGS. 2A to 2D, the MR viewer 200 may be implemented in a number of different ways. For example, referring to FIG. 2A. In some embodiments, an MR viewer 200A may be implemented as a 3D headset including a pair of semitransparent lenses 212 on which images of virtual objects may be displayed. Different stereoscopic images may be displayed on the lenses 212 to create an appearance of depth, while the semitransparent nature of the lenses 212 allow the user to see both the real world as well as the 3D image rendered on the lenses 212. The MR viewer 200A may be implemented, for example, using a Hololens™ from Microsoft Corporation. The Microsoft Hololens includes a plurality of cameras that the device uses to build a 3D model of the space around the user. The device 200A can generate a 3D image to display to the user that takes into account the real world objects around the user and allows the user to interact with the 3D object.

The device 200A may further include other sensors, such as a gyroscopic sensor, a GPS sensor, one or more accelerometers, and/or other sensors that allow the device 200A to determine its position and orientation in space. The device 200A may further include one or more microphones and/or speakers that allow the user to interact audially with the device.

Figure 2A:
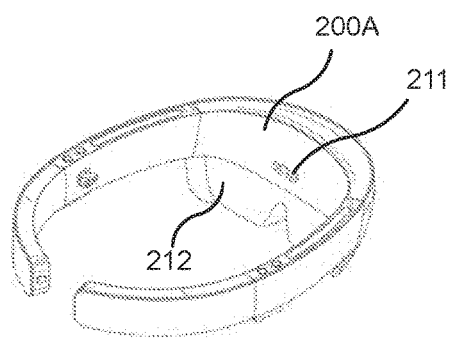
FIGS. 2A to 2D illustrate mixed reality viewers according to various embodiments.
Figure 2B:
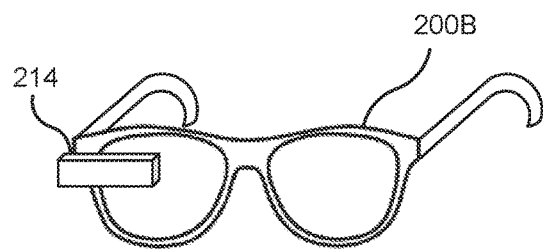

Referring to FIG. 2B, an MR viewer 200B may be implemented as a pair of glasses 200B including a transparent prismatic display 214 that displays an image to a single eye of the user. An example of such a device is the Google Glass device. Such a device may be capable of displaying images to the user while allowing the user to see the world around the user, and as such can be used as a mixed reality viewer. However, it will be appreciated that the device 200B may be incapable of displaying 3D images to the user.

Figure 2C:
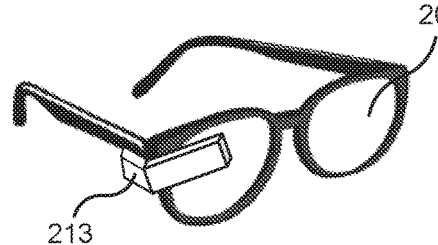
Figure 2D:
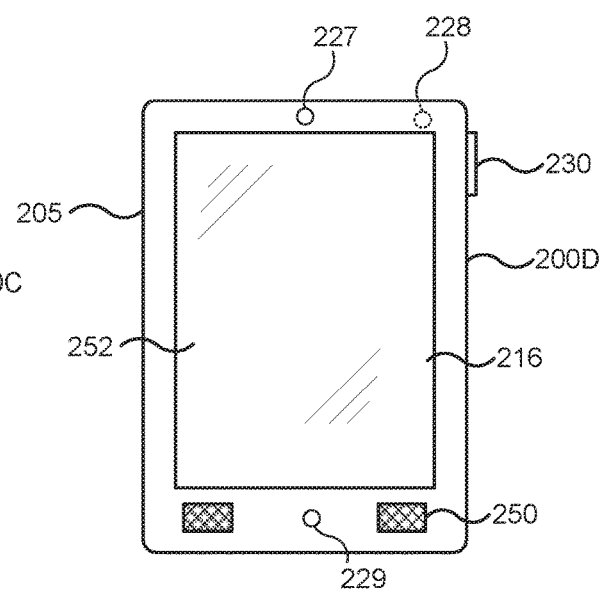

In other embodiments, referring to FIG. 2C, the MR viewer may be implemented using a virtual retinal display device 200C. In contrast to devices that display an image within the field of view of the user, a virtual retinal display raster scans an image directly onto the retina of the user. Like the device 200B, the virtual retinal display device 200C combines the displayed image with surrounding light to allow the user to see both the real world and the displayed image. However, also like the device 200B, the virtual retinal display device 200C may be incapable of displaying 3D images to the user.

In still further embodiments, an MR viewer 200D may be implemented using a mobile wireless device, such as a mobile telephone, a tablet computing device, a personal digital assistant, or the like. The device 200D may be a handheld device including a housing 205 on which a touchscreen display device 216 including a digitizer 252 is provided. An input button 230 may be provided on the housing and may act as a power or control button. A rear facing camera 227 may be provided in a front face of the housing 205. The device 200D may further include a front facing camera 228 on a rear face of the housing 205. The device 200D may include one or more speakers 250 and a microphone 229. The device 200D may provide a mixed reality display by capturing a video signal using the front facing camera 228 and displaying the video signal on the display device 216, and also displaying a rendered image of a virtual object over the captured video signal. In this manner, the user may see both a mixed image of both a real object in front of the device 200D as well as a virtual object superimposed over the real object to provide a mixed reality viewing experience.

3D Environment Generation

Figure 3A:
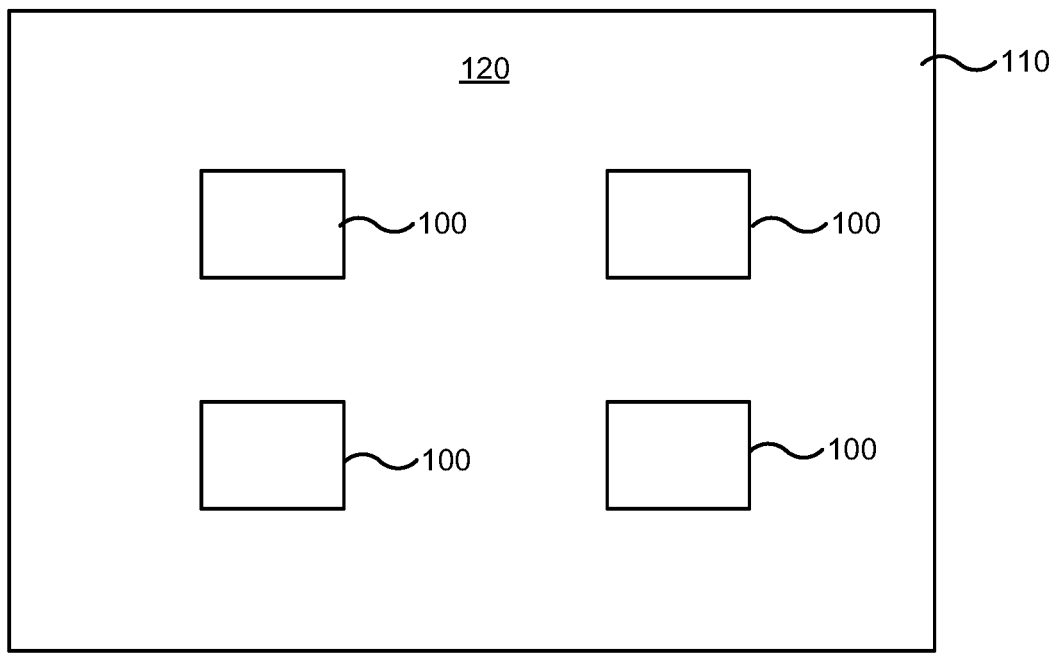
FIG. 3A is a map of a gaming area, such as a casino floor.

FIG. 3A illustrates, in plan view, an example map of a gaming area 120. The gaming area 120 may, for example, be a casino floor. The map shows the location of a plurality of EGMs 100 within the gaming area. As will be appreciated, the locations of the EGMs 100 within a gaming area are generally fixed, although a casino operator may relocate EGMs from time to time, such as when new EGMs are introduced, to create new traffic flow patterns within the gaming area 120, to feature or highlight certain games, etc. As noted above, in order to assist the operation of the MR viewers 200, the MR controller 70 may store a three dimensional wireframe map of the gaming area 120, and may provide the three dimensional wireframe map to the MR viewers 200.

Figure 3B:
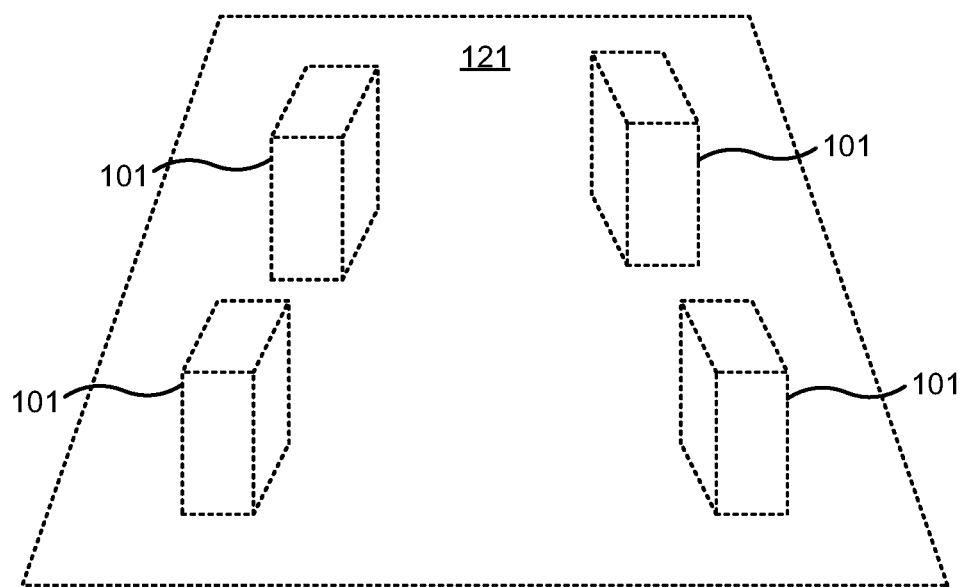
FIG. 3B is a three dimensional wireframe model of the gaming area of FIG. 3A.

An example of a wireframe map 121 is shown in FIG. 3B. The wireframe map is a three-dimensional model of the gaming area 120. As shown in FIG. 3B, the wireframe map 121 includes wireframe models 101 corresponding to the EGMs 100 that are physically in the gaming area 120. The wireframe models 101 may be pregenerated to correspond to various EGM form factors, such as single display EGMs, mechanical slot EGMs, dual display EGMs, etc. The pregenerated models may then be placed into the wireframe map, for example, by a designer or other personnel. The wireframe map 121 may be updated whenever the physical location of EGMs in the gaming area is changed.

In some embodiments, the wireframe map 121 may be generated automatically using an MR viewer 200, such as a 3D headset, that is configured to perform a three-dimensional depth scan of its surroundings and generate a three dimensional model based on the scan results. Thus, for example, an operator using an MR viewer 200A (FIG. 2A) may perform a walkthrough of the gaming area 120 while the MR viewer 200A builds the 3D map of the gaming area.

The three dimensional wireframe map 121 may enable an MR viewer 200 to more quickly and accurately determine its position and/or orientation within the gaming area. For example, an MR viewer 200 may determine its location within the gaming area 120 using one or more position/orientation sensors. The MR viewer 200 then build a three dimensional map of its surroundings using depth scanning, and compares its sensed location relative to objects within the generated three dimensional map with an expected location based on the location of corresponding objects within the wireframe map 121. The MR viewer may calibrate or refine its position/orientation determination by comparing the sensed position of objects with the expected position of objects based on the wireframe map 121. Moreover, because the MR viewer 200 has access to the wireframe map 121 of the entire gaming area 120, the MR viewer 200 can be aware of objects or destinations within the gaming area 120 that it has not itself scanned. Processing requirements on the MR viewer 200 may also be reduced because the wireframe map 121 is already available to the MR viewer 200.

In some embodiments, the wireframe map 121 may store various information about EGMs in the gaming area, such as the identity, type and location of various types of EGMs, the locations of exits, bathrooms, courtesy desks, cashiers, ATMs, ticket redemption machines, etc. Such information may be used by an MR viewer 200 to help the user navigate the gaming area. For example, if a user desires to find a destination within the gaming area, the user may ask the MR viewer 200 for directions using a built-in microphone and voice recognition function in the MR viewer 200. The MR viewer 200 may process the request to identify the destination, and then may display a virtual object, such as a virtual path on the ground, virtual arrow, virtual sign, etc., to help the user to find the destination. In some embodiments, for example, the MR viewer 200 may display a halo or glow around the destination to highlight it for the user.

Accordingly, mixed reality may be used to overlay locations of player's favorite games or by use of a recommender system, show players a map that leads to an interesting game for them. The virtual map generated for the player could display virtual feet or a line that is on the ground and leads to a gaming machine. The gaming machine could have a virtual glow around it and virtual 3D sounds coming from it so players could more easily find the machine.

Mixed Reality Applications

Figure 4A:
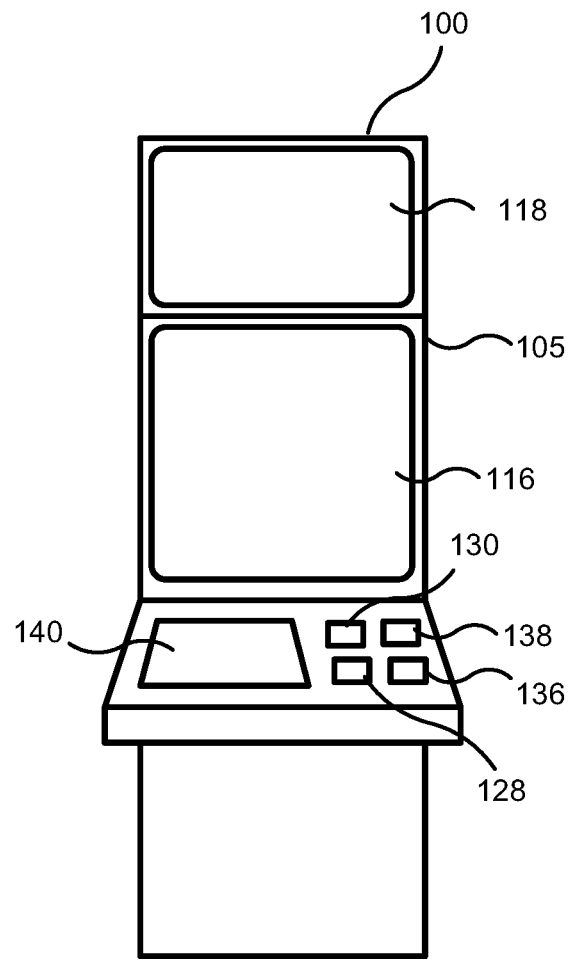
FIG. 4A is a perspective view illustrating a player and an electronic gaming machine.
Figure 4A:
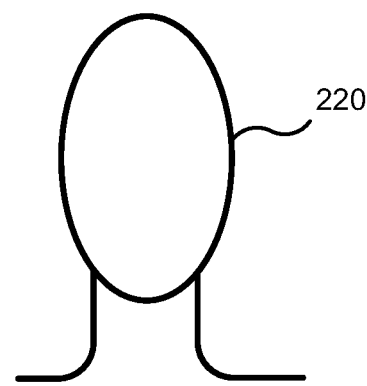

FIG. 4A illustrates an EGM 100 that may be utilized in conjunction with an MR viewer 200. The EGM 100 may include a support structure, housing or cabinet 105 which provides support for a plurality of displays, inputs, outputs, controls and other features that enable a player to interact with the EGM 100.

The EGM 100 illustrated in FIG. 4A includes a number of display devices, including a primary display device 116 located in a central portion of the cabinet 105 and a secondary display device 118 located in an upper portion of the cabinet 105. It will be appreciated that one or more of the display devices 116, 118 may be omitted, or that the display devices 116, 118 may be combined into a single display device. The EGM 100 may further include a player tracking display 140 that may be used to display a service window that allows the player to interact with, for example, their player loyalty account to obtain features, bonuses, comps, etc. The EGM 100 may further include other displays, such as a credit display that displays a player's current number of credits, cash, account balance or the equivalent and/or a display that displays a player's amount wagered.

The EGM 100 may further include a number of input devices that allow a player to provide various inputs to the EGM 100, either before, during or after a game has been played. For example, the EGM 100 may include a plurality of input buttons 130 that allow the player to select options before, during or after game play. The input buttons 130 may include, for example, a game play initiation button that is used to start a game and a cashout button that is utilized to receive a cash payment or any other suitable form of payment corresponding to a quantity of remaining credits of a credit display.

The EGM 100 also includes various features that enable a player to deposit credits in the EGM 100 and withdraw credits from the EGM 100, such as in the form of a payout of winnings, credits, etc. For example, the EGM 100 may include a ticket dispenser 136 that is configured to generate and provide a ticket or credit slip representing a payout and/or a credit balance. The ticket or credit slip is printed by the EGM 100 when the cashout button is pressed, and typically includes a barcode or similar device that allows the ticket to be redeemed via a cashier, a kiosk, or other suitable redemption system, or to be deposited into another gaming machine. The EGM 100 may further include a bill/ticket acceptor 128 that allows a player to deposit credits in the EGM 100 in the form of paper money or a ticket/credit slip.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

As illustrated in FIG. 4A, a player 220 may operate the EGM 100 while standing or sitting in front of the EGM 100 so that the player can see and operate the input and output devices on the EGM 100.

Figure 4B:
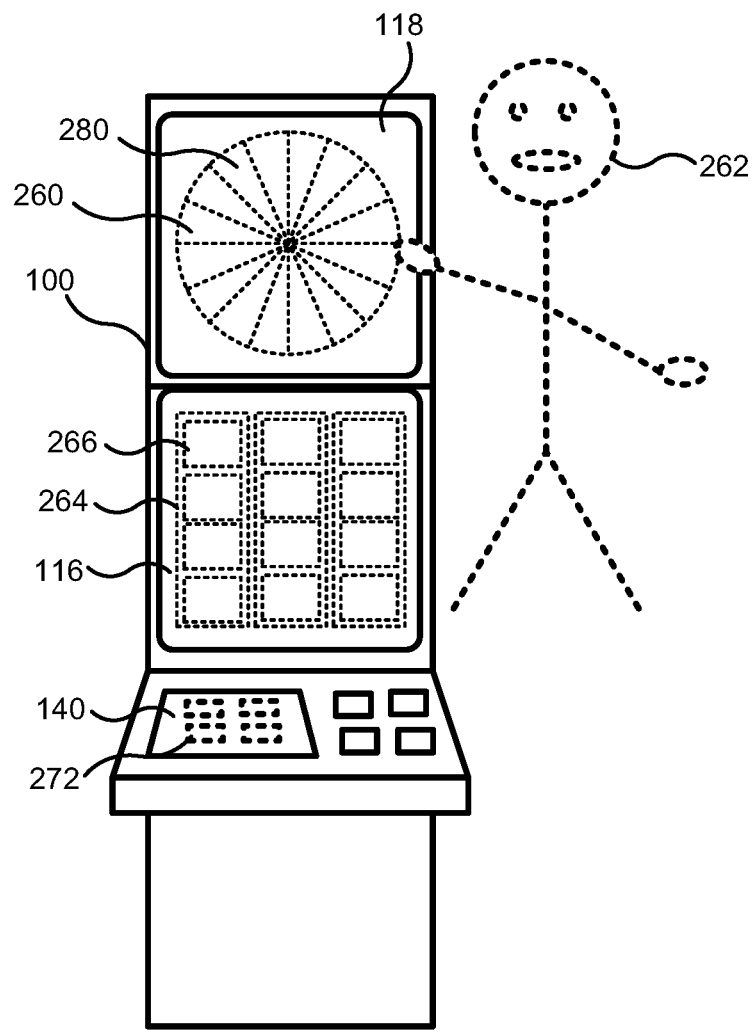
FIG. 4B is a perspective view illustrating a player using an electronic gaming machine in conjunction with a mixed reality viewer according to some embodiments.
Figure 4B:
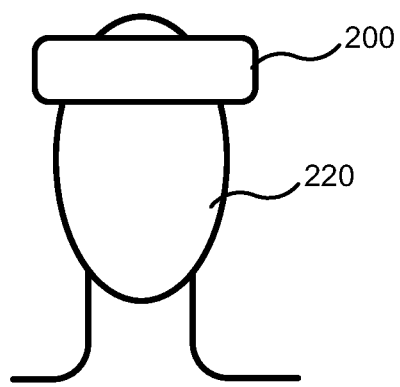

Referring to FIG. 4B, the user 220 is illustrated while viewing the EGM 100 through an MR viewer 200 in the form of an MR headset. The user 220 can see both the WGM 100 and virtual content 260 rendered by the MR headset 200. The virtual content is viewable only by a person (in this case the player) who is using an MR viewer. An observer without an MR viewer would not see the virtual content 260. In FIG. 4B and in subsequent figures, content that is only viewable using an MR viewer is shown in broken lines.

The virtual content 260 can be rendered by the MR headset 200 such that it appears to be displayed on the EGM 100. Moreover, the virtual content 260 can include both virtual objects that are part of the game play as well as virtual input devices that may be used to initiate or control game play. For example, the virtual content 260 can include one or more virtual reels 264 on which virtual symbols or glyphs 266 are provided to simulate a reel-type slot machine game. The virtual reels 264 may be rendered in two or three dimensions, and may be rendered on, beside, above, or in front of one of the display screens of the EGM 100, such as the primary display screen 116. Other content, such as bonus content 280 can be rendered on the secondary display screen 118. For example, the bonus content may include a two dimensional virtual object. When the bonus feature is activated, the two dimensional virtual object may become a 3D object that appears to fly off the display screen 118 and, for example, down in front of the player or around the EGM 100.

The player can interact with the virtual objects, for example, using their hand, whose position may be tracked by the MR headset 200. For example, the player could spin a virtual reel by swiping it with their hand.

In some embodiments, as illustrated in FIG. 4B, a 3D avatar 262 could appear around the EGM 100 and give helpful hints to the player while they play the game. The avatar 262 could interact with the game by helping the player, and reacting to what is happening on gaming machine. The 3D avatar 262 may perform interactions with the game, such as by re-spinning a reel, giving a multiplier, giving a free spin, nudging a reel, giving a wild symbol, etc. The 3D avatar 262 may interact with the user using voice activation and hand gestures. In some embodiments, the 3D avatar 262 may give the user the option to use different abilities to use, and the user can cause the 3D avatar 262 to carry out an action requested by the player.

As a specific but non-limiting example, in some embodiments, the EGM 100 may provide a reel game with a main game bonus feature in which a hidden prize/bonus feature is presented by a 3D avatar 262. The hidden bonus feature may be treated like a mystery prize, where the prize is not awarded based upon the visible reel elements on screen. The EGM 100 would send a message to the MR viewer 200 which would make the avatar 262 reveal the awarded bonus feature and interact with the game. When the avatar 262 interacts with the reel game, the avatar may perform an action to reveal the bonus feature. The MR viewer 200 and the may send a message back to the EGM 100 to update the player's view of the EGM 100 to reflect the bonus feature being activated. The game will then pay out the final awarded amount for the outcome and the game can then continue as normal.

As a further non-limiting example, an EGM 100 may have a virtual 3D wheel topper. The EGM 100 may not have a secondary display screen; rather the space that would normally be occupied by a display screen may be a blank space or a touch screen in a slant top format. When the user connects with the MR viewer 200, the virtual 3D wheel may be displayed above the EGM 100. When the player triggers a bonus, the 3D reel may change from a flat vertical orientation, break free of the EGM 100, and fly around the player and land in an open area in front of the player. A word puzzle may be displayed by the MR viewer 200 above the wheel with a category listed. The 3D wheel may take a horizontal orientation and the user may be prompted to spin the wheel using a physical gesture. If the wheel lands on a prize amount, the player may then be prompted to choose a letter from a floating list of letters to the side of the wheel and puzzle. Once the player has picked a letter, such as with a pinch or poke gesture, the letters light up on the word puzzle and are paid a multiplier based up the number of letters revealed. Other outcomes or effects are possible. When the bonus ends, the wheel fly back up towards the top of the EGM 100 and return to is position above the display screen.

In some embodiments, gameplay on the EGM 100 may proceed normally in most scenarios, but may send out messages to the MR viewer 200 on what sequence or feature that the MR viewer 200 could use. The MR viewer 200 may thus be used as a secondary input system and display. Some of the features, such as with the Avatar concept, may allow the user to choose when to use the avatar to affect the game, while others may play out animation sequences on the MR viewer 200 to augment the gaming experience. The outcome of a game may be generated on the EGM 100, and the results and commands to start the bonus may be sent to the MR viewer 200. The EGM 100 would then wait for a response back from the MR viewer 200 on when it has finished playing a wheel or other bonus feature and the game would continue on. When the player interacts with a virtual object with either a gesture or voice command, a message may be sent to the EGM 100 from the MR viewer 200, and the EGM 100 may process the message and react accordingly. A messaging protocol is used to send messages back and forth between the EGM 100 and the MR viewer 200 and the sync up the actions of both.

Figure 5:
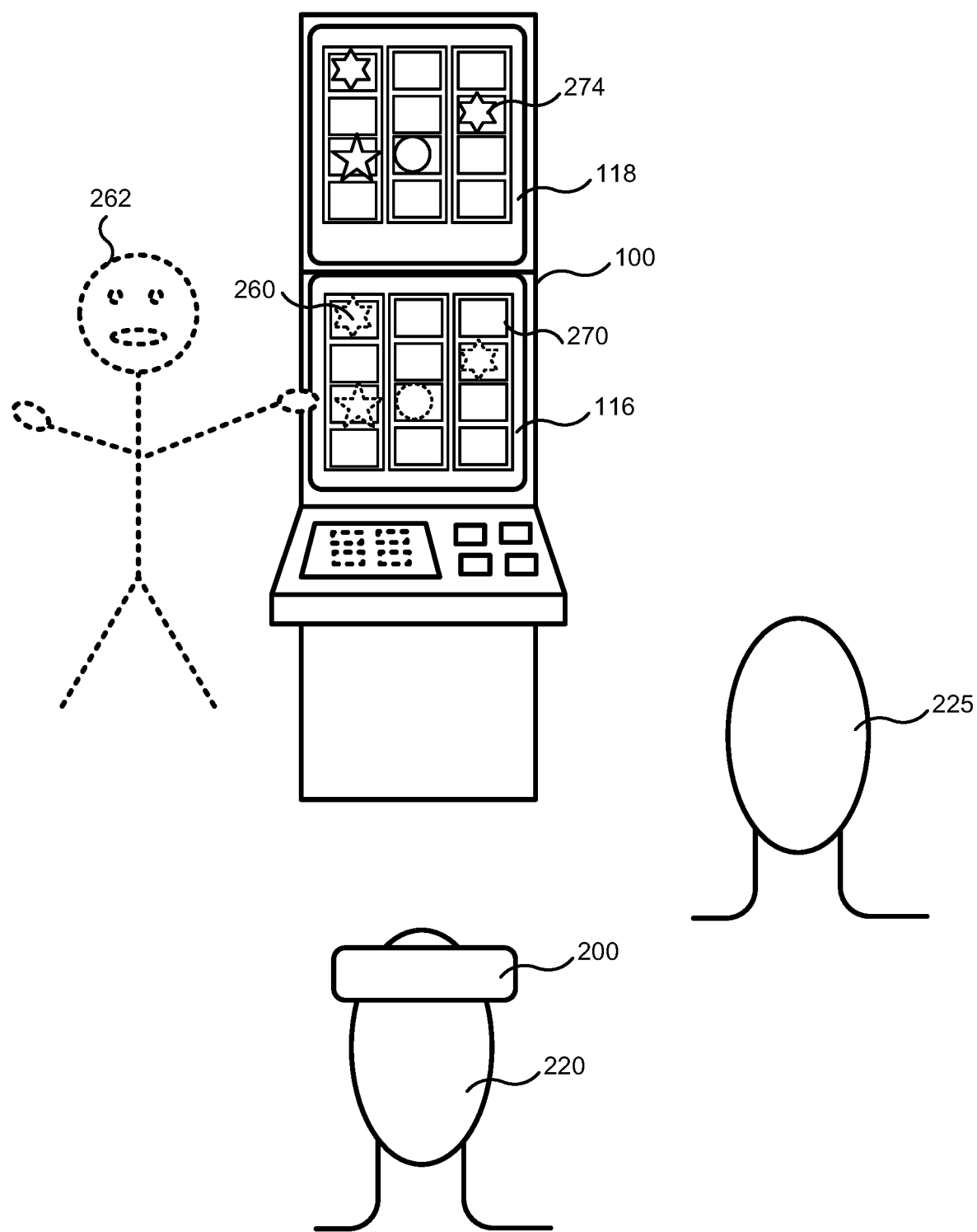
FIGS. 5 and 6 are perspective views illustrating a player using an electronic gaming machine in conjunction with a mixed reality viewer according to further embodiments.

FIG. 5 illustrates embodiments in which MR content is displayed in a manner such that it can be seen by the player using an MR headset 200 and also by an observer who is not using an MR headset. In some cases, it is desirable for other people to be able to watch the gameplay of the game, for example, to promote interest in the game, or to enable others to watch the progress of the game. In the embodiments illustrated in FIG. 5, 2D content 270 may be rendered on the primary display screen 116. The MR headset 200 may display 3D content 260 that appears to be on or in front of the primary display screen 116, and that together with the 3D content 260 provides the game play content that is displayed to the player 220. However, an observer 225 who is watching the EGM 100 without using an MR viewer 200 would not see the 3D content 260 on the primary display screen 116.

In this case, the EGM also displays the 2D content 270 on the secondary display screen 118, and also renders and displays the 3D content 260 as 2D content 274 on the secondary display screen 118. In this manner, the observer 225 can see the entire game content displayed on the secondary display screen, albeit in two dimensions rather than three as seen by the player 220.

Figure 6:
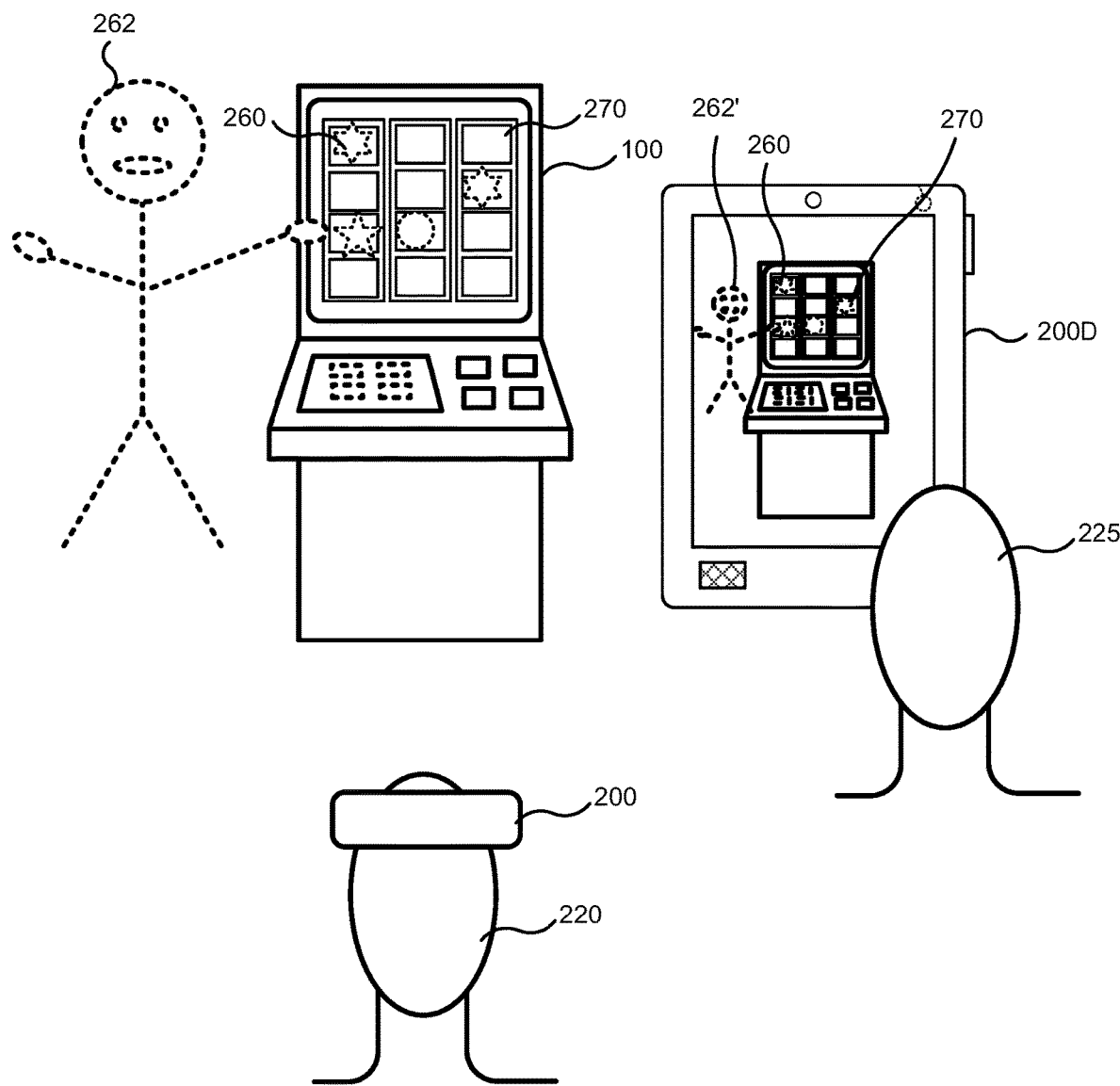

Referring to FIG. 6, in some embodiments an observer 225 may also use an MR viewer 200, such as an MR viewer 200D, to view the game content along with the player 220. In this case, the EGM 100 displays 2D content 270 on a single display screen 116, and the MR viewer 200 renders 3D content 260 that is visible to the player 200.

At the same time, an observer 225 may view both the 2D content 270 as well as the 3D content, rendered in 2D format, on the screen of the MR viewer 200D. In this manner, the observer 225 can watch the entire gameplay experience along with the player 220.

Displayless and Virtual EGMs with Mixed Reality Viewer

In some embodiments, all of the gameplay content may be displayed by an MR viewer 200 instead of on a display screen of an EGM. In such embodiments, the EGM may omit the display screen altogether. Moreover, many of the input devices found on the EGM may be omitted, and the user may interact with the EGM only through inputs detected by the MR viewer 200.

Figure 7A:
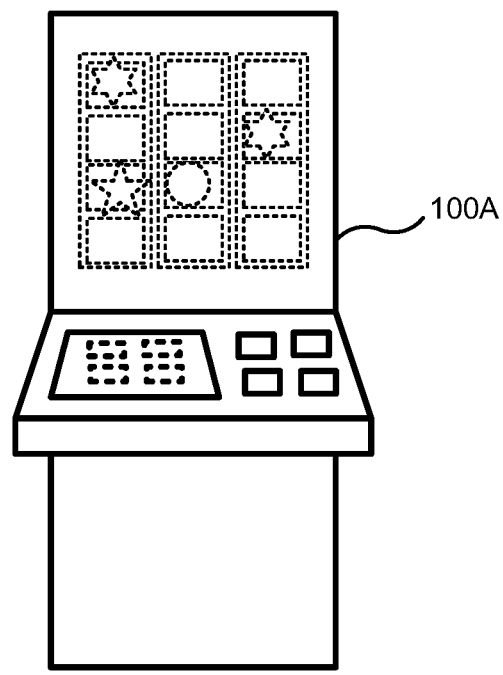
FIG. 7A illustrates a displayless electronic gaming machine.

For example, FIG. 7A illustrates a displayless EGM 100A. The game content may be rendered entirely as virtual content 360 in a spatial relation to the EGM 100A, such as above, beside, or in front of the EGM 100A. In addition, one or more virtual buttons 330 may be displayed by the MR viewer 200, and the user may interact with the game by pressing the virtual buttons 330. In these embodiments, the EGM 100A may still include some minimal controls and/or devices that enable the user to deposit and withdraw credits from the machine, print cashout tickets, or insert a loyalty card.

In some embodiment, the MR viewer 200 may be configured to allow electronic deposit of funds by, for example, scanning a bar code/QR CODE from a Ticket-In-Ticket out credit slip and to deposit a corresponding amount credit in the EGM 100A. The MR viewer may also be able to, for example, read a code on a player loyalty card to identify the player.

Figure 7B:
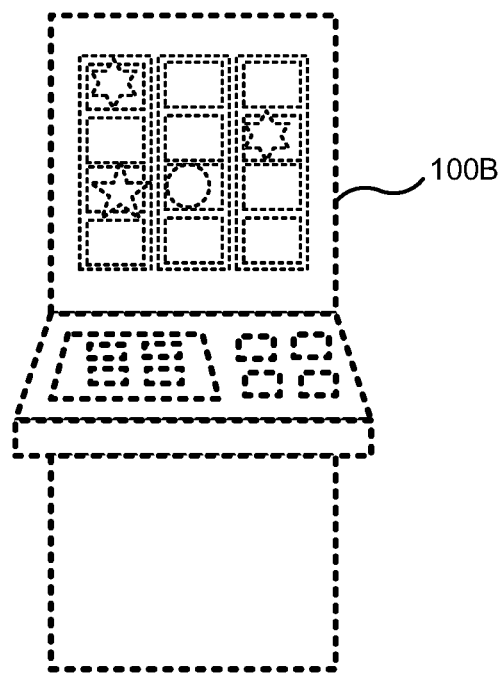
FIG. 7B illustrates a virtual electronic gaming machine.

FIG. 7B illustrates an embodiment in which an entirely virtual EGM 100B is generated by the MR viewer 200. The player can view and interact with the virtual EGM 100B without needing to be near a physical EGM. In these embodiments, the entire interaction, including deposit and withdrawal of credits, may be handled electronically via communication between the MR viewer 200 and the central controller 40 (FIG. 1), the player tracking server 45 (FIG. 1), or an accounting system (not shown).

Multiplayer Mixed Reality Systems

Mixed reality may be used in a multiplayer setting in which each player may simultaneously view and interact with the same virtual content. For example, referring to FIG. 8A, a plurality of players 220-1 to 220-4, each of whom is using a MR headset 200-1 to 200-4 can simultaneously view and interact with virtual content 360. The virtual content 360 can include an object, game board, puzzle, or any other virtual item. The player 220-1 to 220-4 may interact with the virtual content 360 cooperatively, such as to solve a puzzle, or competitively in a player vs player mode. Prizes may be awarded individually and/or collectively for achieving an objective, such as finishing the puzzle. The display and interaction with the 3D content 460 may be coordinated by the MR controller 70 (FIG. 1), which may receive inputs from each of the MR viewers 200, determine how the 3D content should react to the inputs, and then communicate changes in the 3D content to the MR viewers so that it can be rendered to each individual player 200 from the player's unique perspective on the 3D content.

Figure 8A:
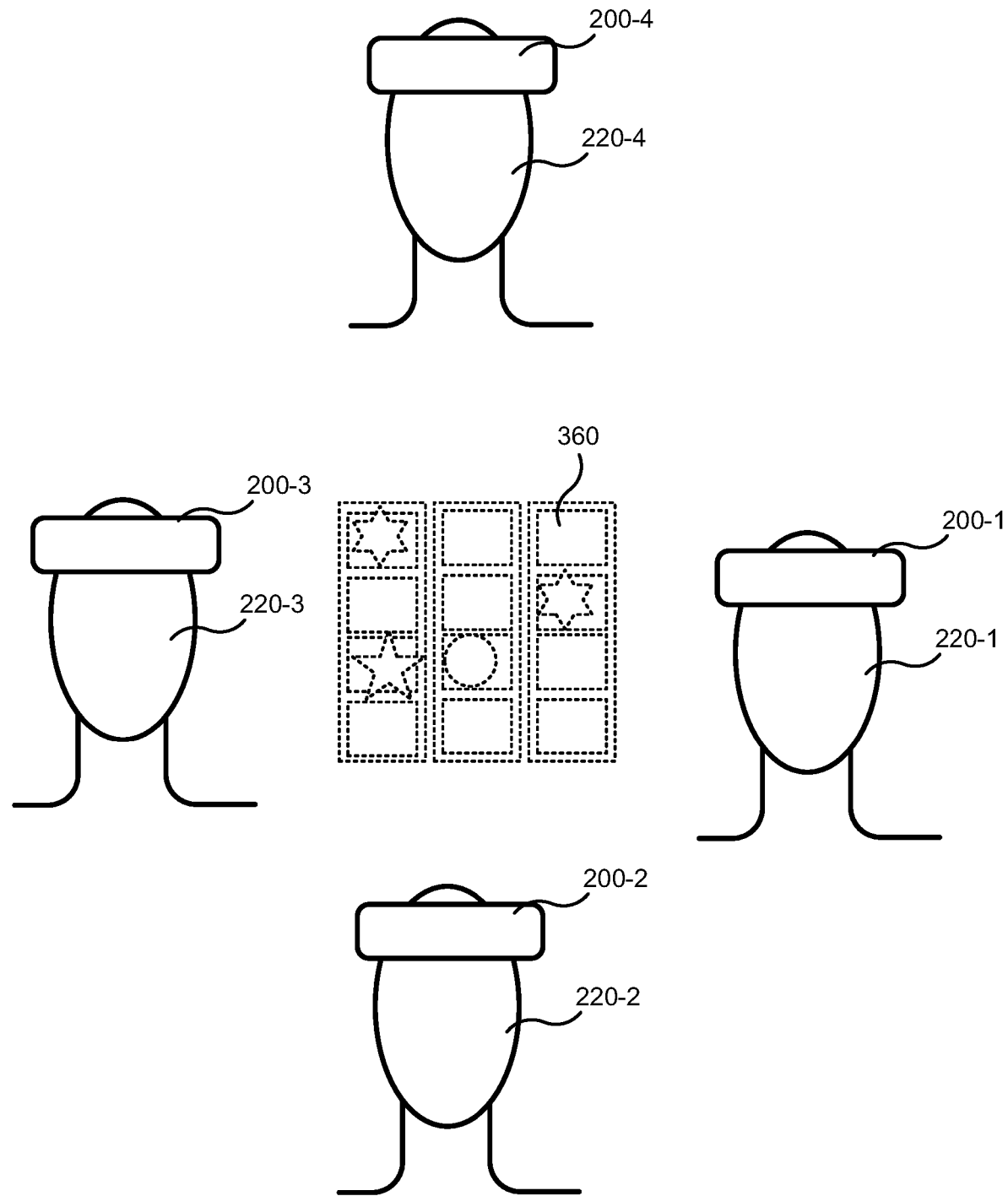
FIGS. 8A and 8B illustrate local and wide area multi-player mixed reality games.

In the embodiment illustrated in FIG. 8A, all of the players are in the same physical location, and the virtual content 360 appears to each of the players to be in the same location. The location and state of the virtual content 360 may be controlled by the MR controller 70, which communicates information about the virtual content 360 to each of the MR headsets 200-1 to 200-4, which render the virtual content 306 to their respective users.

In some embodiments, the virtual content 360 may appear as a game bonus in which each of the players can see a 3D scene, such as a virtual fight between to 3D avatars, play out in front of them. The players may be given the option to place wagers on the outcome of the 3D scene. The amount wagered and who the players wagered on would be unique to each player, but the overall scene would be shared.

As another example, in a shared experience, the players may play a cooperative or competitive first person shooter style game. For example, the virtual content 306 may be a series of enemies that spawn out of the walls of a room, players in the shared area can all see the same enemies. Players are able to shoot the shared enemies for credits. The highest scoring player at the end of the round would get the most money out of a shared pot. Players could be separated onto teams and could work together to try to get the highest score. During gameplay, each MR headset 200 communicates with the MR controller 70, which tracks the player's progress in the gaming session. Once the session is finished, the team with the highest score wins. Non players could bet on the performance of each of the teams or individual players. Observers could watch the game with their own MR viewer or on gaming terminals or computer monitors within the venue. Non-players could then join a team after a session and players can also switch out to a non-player role.

Figure 8B:
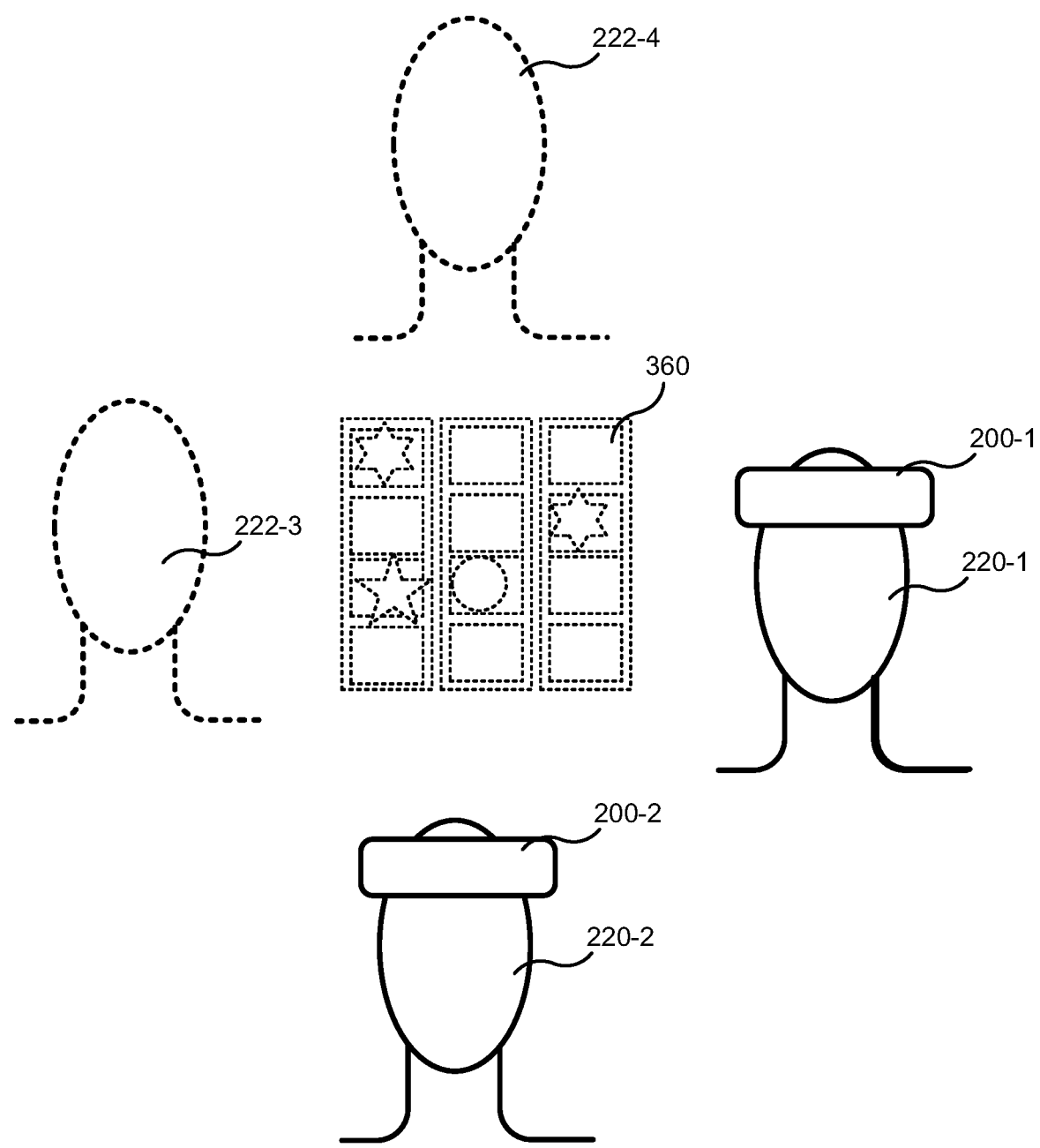

Referring to FIG. 8B, in some embodiments, players at different physical venues can observe and interact with the same virtual content using MR viewers 200. That is, multiple players at different venues may see the same 3D scene and interact together in a shared experience. Such games are referred to herein as Wide Area Mixed Reality (WAMR) games. As illustrated in FIG. 8B, the players 220-1, 220-2 may be located in the same location and may be able to see each other. The other players may be located at remote locations but still see an interact with the virtual content 360. Avatars 222-3 and 222-4 of the remote players may be rendered so that the remote players appear to be in the same location as the local players 220-1, 220-2.

Figure 9:
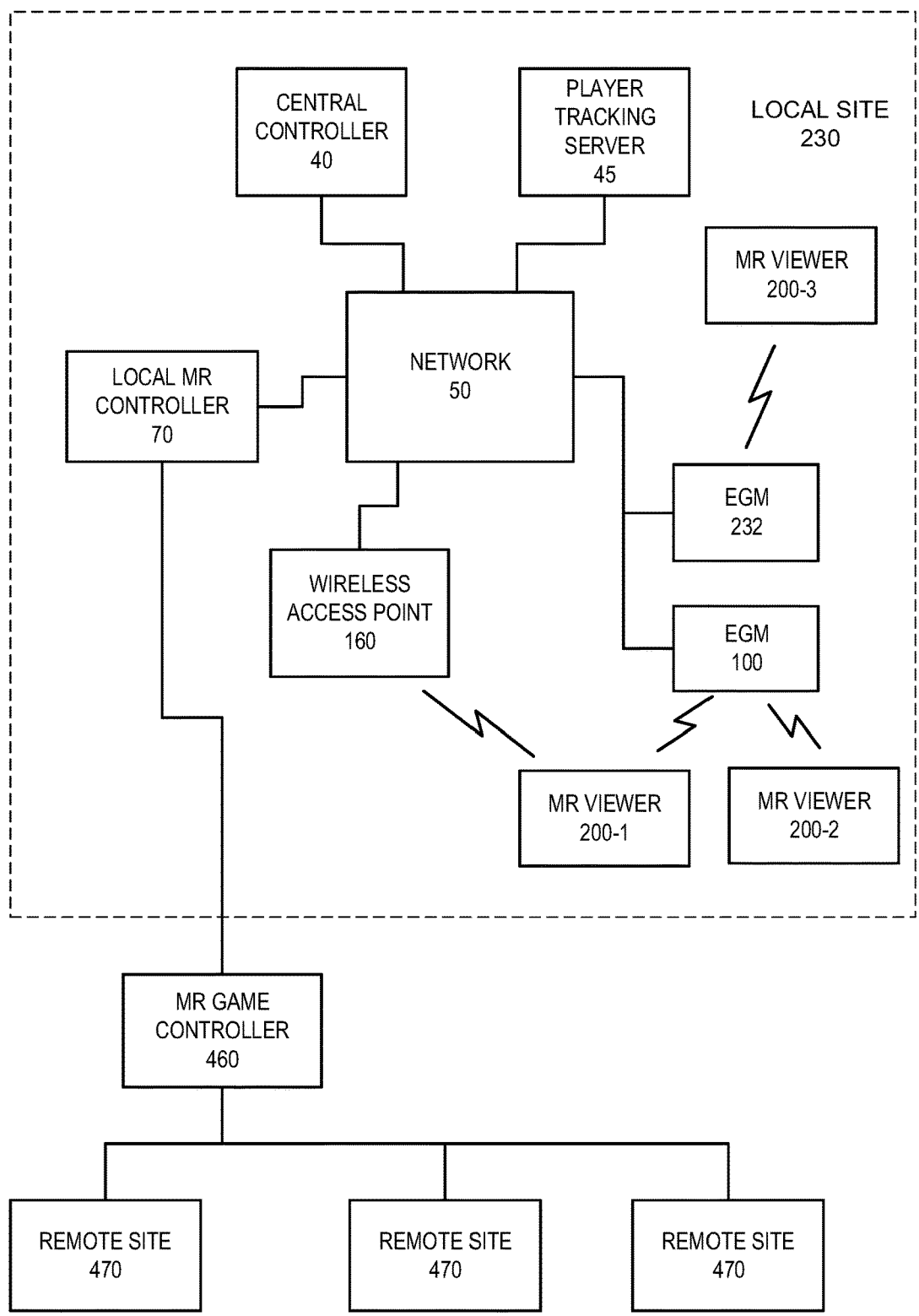
FIG. 9 is a block diagram illustrating a network configuration of a wide area mixed reality game according to some embodiments.

FIG. 9 illustrates an EGM 100 that participates in one or more WAMR games along with players of a plurality of other EGMs that may be located in different locations and that may offer the same game to players as the EGM 100. The participating EGMs may be connected in a game network that enables players of EGMs located at different locations to see and interact with the same 3D content in real time.

Referring to FIG. 9, a wide area mixed reality gaming system is illustrated in which a plurality of EGMs at geographically separated locations can participate in a mixed reality game in which players at the remote locations can see and interact with the same 3D content simultaneously. The EGM 100 is located at a local site 230 along with other EGMs 232 that may participate in the WAMR game. The local site 230 may correspond, for example, to a single gaming establishment at which each of the EGMs 100, 232 is operated. Each of the EGMs 100, 232 is managed by a central controller 40 (FIG. 2) at the local site 230. In some embodiments, the EGMs 100, 232 may be connected to the central controller 40 through a network 50. It will be appreciated, however, that there may be one or more intermediate devices between the EGMs 100, 232 and the central controller, such as routers, switches, data collection units, translators, etc. For example, in some instances, when the hardware interface used by the gaming machine is not compatible with the central controller 40, a translator may be used to convert data from the EGM 100 to a format accepted by the central controller 40.

Within a gaming establishment, the EGMs 100, 232 may be located on the gaming floor for player access while the central controller 40 is usually located in another part of gaming establishment (e.g. the backroom), or at another location.

Each of the EGMs 100, 232 shown in FIG. 9 communicates through the network 50 with a local MR controller 70, which coordinates communication with a WAMR scene controller 460 that controls the overall operation of the wide area mixed reality game. The WAMR scene controller 460 coordinates the display of virtual content at the local site as well as at one or more remote sites 470, each of which includes at least one local AR controller and EGM. The local MR controller 70 manages communication of the EGMs 100, 232 with the AR game controller 460. The local MR controller 70 may further monitors coin-in and payouts of the EGMs 100, 232 and may send a portion of received funds to the AR scene controller for inclusion in a jackpot that can be paid to a winner of the wide area game.

The local MR controller 70 may further be used to route messages indicating contributions and eligibility status to the AR game controller 460. The local MR controller 70 may also be used in a polling scheme to route messages between different EGMs 100, 232 and different AR scene controllers 460.

In one embodiment, a wide area progressive jackpot that is payable to a winner of the wide are mixed reality game may be maintained by AR game controller 460. The EGM 100 may be designed to display a progressive jackpot amount for the progressive game. The progressive jackpot amount may be displayed on a display on or nearby the EGM 100, or may be rendered as virtual content viewable using an MR viewer 200.

In general, the functions of different devices shown in FIG. 9 may be combined or separated as is warranted by a particular gaming environment. For example, the central controller 40 may provide functions of one or more of a local MR controller 70 and/or an AR game controller 460.

In general, the communication network 50 over which the EGMs 100, 232 communicate may not be accessible to the public. Due to the sensitive nature of much of the information on the dedicated networks, for example, electronic fund transfers and player tracking data, usually the manufacturer of a host system, such as a player tracking system, or group of host systems, employs a particular networking language having proprietary protocols. These proprietary protocols are usually considered highly confidential and not released publicly. Thus, whenever a new host system is introduced for use with a gaming machine, rather than trying to interpret all the different protocols utilized by different manufacturers, the new host system is typically designed as a separate network. Consequently, as more host systems are introduced, the independent network structures continue to build up in the casino.

Further, in the gaming industry, many different manufacturers make gaming machines. The communication protocols on the gaming machine are typically hard-coded into the gaming machine software, and each gaming machine manufacturer may utilize a different proprietary communication protocol. A gaming machine manufacturer may also produce host systems, in which case their gaming machines are compatible with their own host systems. However, in a heterogeneous gaming environment, such as a casino, gaming machines from many different manufacturers, each with their own communication protocol, may be connected to host systems from many different manufacturers, each with their own communication protocol. Therefore, communication compatibility issues regarding the protocols used by the gaming machines in the system and protocols used by the host systems must be considered.

Communications between the local MR controller 70 and the AR game controller 460 may occur over public and/or private networks, and may include circuit switched and/or packet switched networks or sub-networks. Accordingly, communication sessions between the local MR controller 70 and the AR game controller 460 may be authenticated, and the communications themselves may be encrypted for security.

Electronic Gaming Machines

Figure 10A:
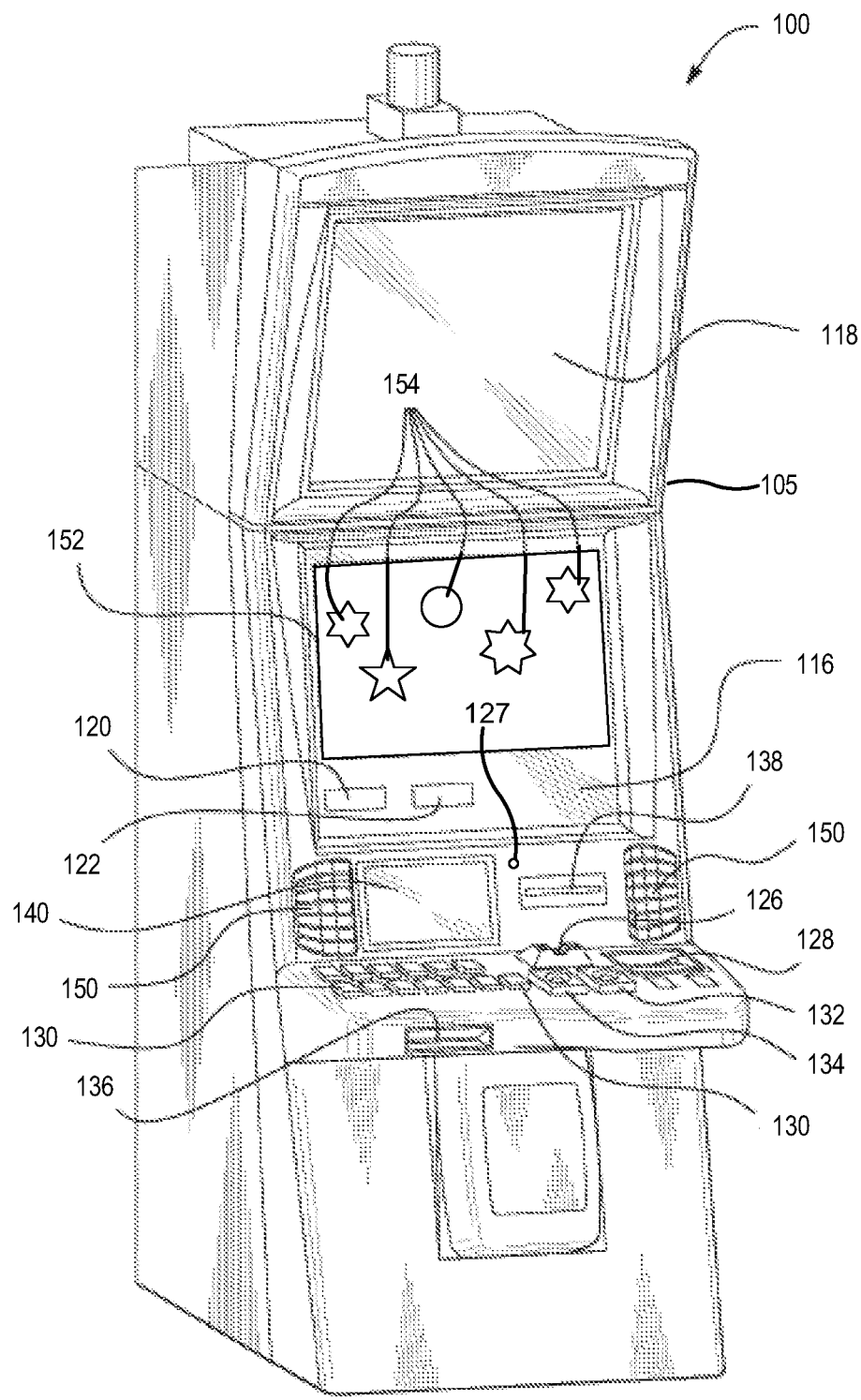
FIG. 10A is a perspective view of an electronic gaming device that can be configured according to some embodiments.
Figure 10B:
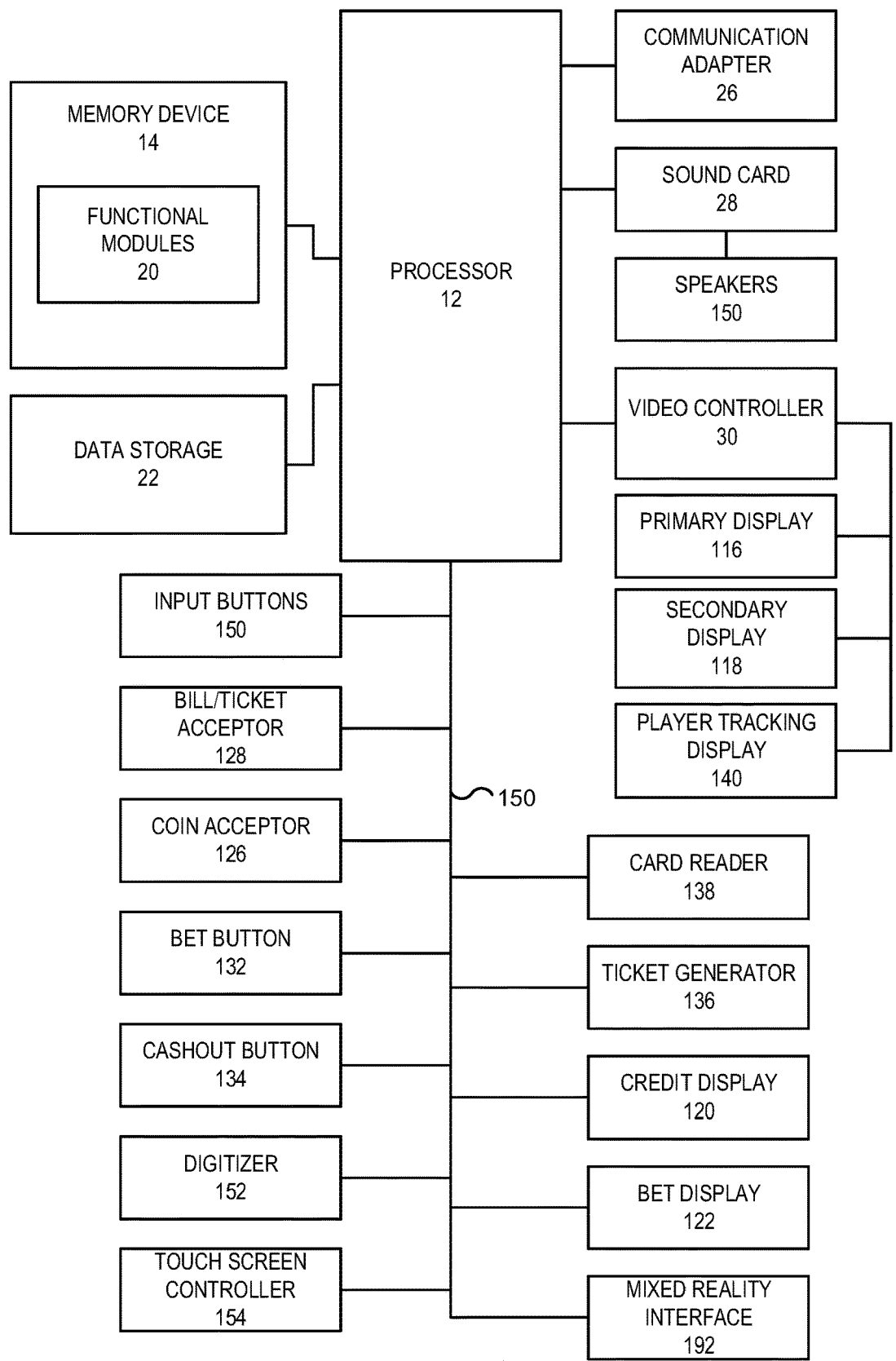
FIG. 10B is a schematic block diagram illustrating an electronic configuration for a gaming device according to some embodiments.
Figure 10C:
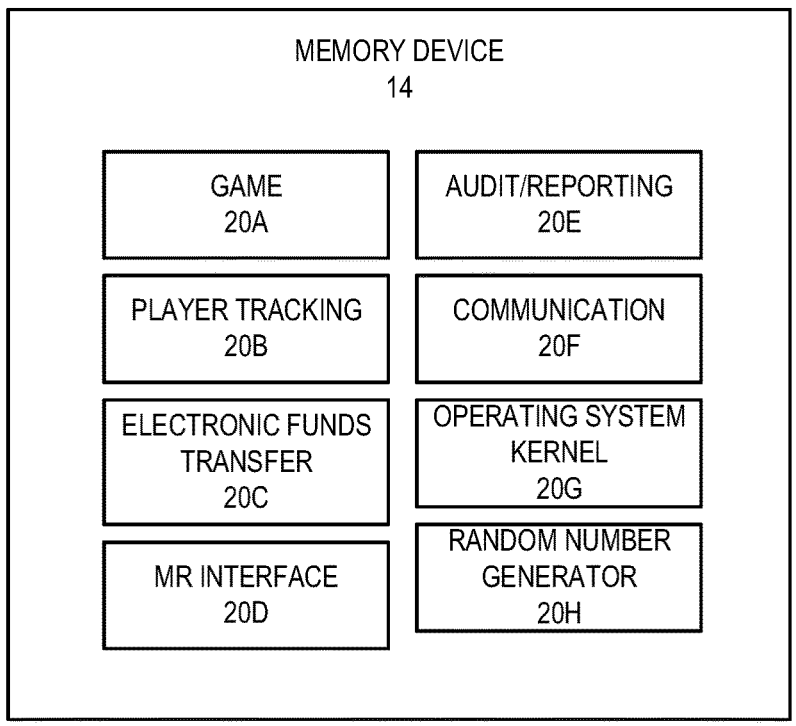
FIG. 10C is a block diagram that illustrates various functional modules of an electronic gaming device according to some embodiments.

An example of an electronic gaming machine (EGM) that can interact with mixed reality viewers according to various embodiments is illustrated in FIGS. 10A, 10B, and 10C in which FIG. 10A is a perspective view of an EGM 100 illustrating various physical features of the device, FIG. 10B is a functional block diagram that schematically illustrates an electronic relationship of various elements of the EGM 100, and FIG. 10C illustrates various functional modules that can be stored in a memory device of the EGM 100. The embodiments shown in FIGS. 10A to 10C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs typically include a number of standard features, many of which are illustrated in FIGS. 10A and 10B. For example, referring to FIG. 10A, an EGM 100 may include a support structure, housing or cabinet 105 which provides support for a plurality of displays, inputs, outputs, controls and other features that enable a player to interact with the EGM 100.

The EGM 100 illustrated in FIG. 1A includes a number of display devices, including a primary display device 116 located in a central portion of the cabinet 105 and a secondary display device 118 located in an upper portion of the cabinet 105. It will be appreciated that one or more of the display devices 116, 118 may be omitted, or that the display devices 116, 118 may be combined into a single display device. The EGM 100 may further include a player tracking display 140, a credit display 120, and a bet display 122. The credit display 120 displays a player's current number of credits, cash, account balance or the equivalent. The bet display 122 displays a player's amount wagered.

The player tracking display 140 may be used to display a service window that allows the player to interact with, for example, their player loyalty account to obtain features, bonuses, comps, etc. In other embodiments, additional display screens may be provided beyond those illustrated in FIG. 10A.

The EGM 100 may further include a number of input devices that allow a player to provide various inputs to the EGM 100, either before, during or after a game has been played. For example, the EGM 100 may include a plurality of input buttons 130 that allow the player to select options before, during or after game play. The EGM may further include a game play initiation button 132 and a cashout button 134. The cashout button 134 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 10A and 10B includes a game play activation device in the form of a game play initiation button 132. It should be appreciated that, in other embodiments, the EGM 100 begins game play automatically upon appropriate funding rather than upon utilization of the game play activation device.

In some embodiments, one or more input devices of the EGM 100 are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 152 and a touchscreen controller 154 (FIG. 10B). The player may interact with the EGM 100 by touching virtual buttons on one or more of the display devices 116, 118, 140. Accordingly, any of the above described input devices, such as the input buttons 130, the game play initiation button 132 and/or the cashout button 134 may be provided as virtual buttons on one or more of the display devices 116, 118, 140.

Referring briefly to FIG. 10B, operation of the primary display device 116, the secondary display device 118 and the player tracking display 140 may be controlled by a video controller 30 that receives video data from a processor 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor 12. In some embodiments however, the credit display 120 and/or the bet display 122 may be driven by the video controller 30.

Referring again to FIG. 10A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device 116, 118. 140 may includes a touch-screen with an associated touch-screen controller 154 and digitizer 152. The display devices 116, 118. 140 may be of any suitable size, shape, and/or configuration. The display devices 116, 118. 140 may include flat or curved display surfaces.

The display devices 116, 118, 140 and video controller 30 of the EGM 100 are generally configured to display one or more game and/or non-game images, symbols, and indicia. In certain embodiments, the display devices 116, 118, 140 of the EGM 100 are configured to display any suitable visual representation or exhibition of the movement of objects; dynamic lighting; video images; images of people, characters, places, things, and faces of cards; and the like. In certain embodiments, the display devices 116, 118. 140 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 116, 118. 140 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include a ticket dispenser 136, a bill/ticket acceptor 128, and a coin acceptor 126 that allows the player to deposit coins into the EGM 100.

While not illustrated in FIG. 10A, the EGM 100 may also include a note dispenser configured to dispense paper currency and/or a coin generator configured to dispense coins or tokens in a coin payout tray.

The EGM 100 may further include one or more speakers 150 controlled by one or more sound cards 28 (FIG. 10B). The EGM 100 illustrated in FIG. 10A includes a pair of speakers 150. In other embodiments, additional speakers, such as surround sound speakers, may be provided within or on the cabinet 105. Moreover, the EGM 100 may include built-in seating with integrated headrest speakers.

In various embodiments, the EGM 100 may generate dynamic sounds coupled with attractive multimedia images displayed on one or more of the display devices 116, 118. 140 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 10B is a block diagram that illustrates logical and functional relationships between various components of an EGM 100. As shown in FIG. 1B, the EGM 100 may include a processor 12 that controls operations of the EGM 100. Although illustrated as a single processor, multiple special purpose and/or general purpose processors and/or processor cores may be provided in the EGM 100. For example, the EGM 100 may include one or more of a video processor, a signal processor, a sound processor and/or a communication controller that performs one or more control functions within the EGM 100. The processor 12 may be variously referred to as a "controller," "microcontroller," "microprocessor" or simply a "computer." The processor may further include one or more application-specific integrated circuits (ASICs).

Various components of the EGM 100 are illustrated in FIG. 10B as being connected to the processor 12. It will be appreciated that the components may be connected to the processor 12 through a system bus, a communication bus and controller, such as a USB controller and USB bus, a network interface, or any other suitable type of connection.

The EGM 100 further includes a memory device 14 that stores one or more functional modules 20. Various functional modules 20 of the EGM 100 will be described in more detail below in connection with FIG. 10D.

The memory device 14 may store program code and instructions, executable by the processor 12, to control the EGM 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (MRAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The EGM 100 may include a communication adapter 26 that enables the EGM 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processor 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor through a universal serial bus (USB) hub (not shown) connected to the processor 12. U.S. Patent Application Publication No. 2004/0254014 describes a variety of EGMs including one or more communication ports that enable the EGMs to communicate and operate with one or more external peripherals.

In some embodiments, the EGM 100 may include a sensor, such as a camera in communication with the processor 12 (and possibly controlled by the processor 12) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processor 12 may incorporate that image into the primary and/or secondary game as a game image, symbol or indicia.

Various functional modules of that may be stored in a memory device 14 of an EGM 100 are illustrated in FIG. 10C. Referring to FIG. 10C, the EGM 100 may include in the memory device 14 a game module 20A that includes program instructions and/or data for operating a hybrid wagering game as described herein. The EGM 100 may further include a player tracking module 20B, an electronic funds transfer module 20C, a wide area progressive module 20D, an audit/reporting module 20E, a communication module 20F, an operating system 20G and a random number generator 20H. The player tracking module 20B keeps track of the play of a player. The electronic funds transfer module 20C communicates with a back end server or financial institution to transfer funds to and from an account associated with the player. The wide area progressive (WAP) interface module 20D interacts with a remote WAP server to enable the EGM 100 to participate in a wide area progressive jackpot game as described in more detail below. The communication module 20F enables the EGM 100 to communicate with remote servers and other EGMs using various secure communication interfaces. The operating system kernel 20G controls the overall operation of the EGM 100, including the loading and operation of other modules. The random number generator 20H generates random or pseudorandom numbers for use in the operation of the hybrid games described herein.

In some embodiments, an EGM 100 may be implemented by a desktop computer, a laptop personal computer, a personal digital assistant (PDA), portable computing device, or other computerized platform. In some embodiments, the EGM 100 may be operable over a wireless network, such as part of a wireless gaming system. In such embodiments, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 10D:
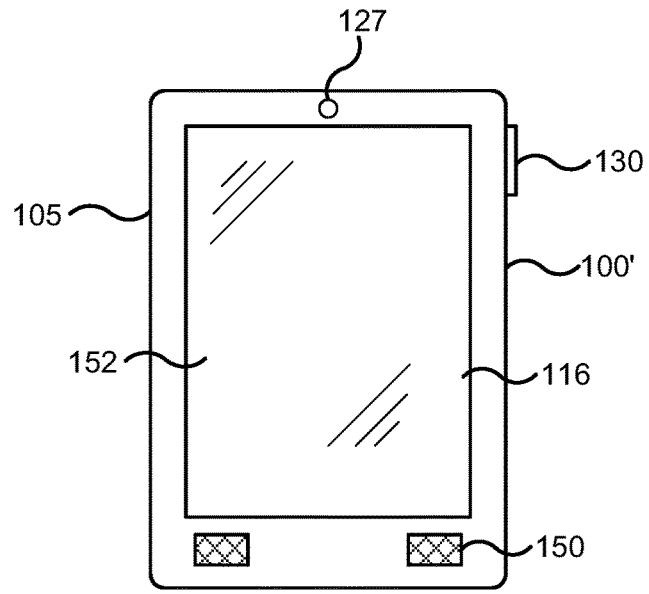
FIG. 10D is perspective view of a handheld electronic gaming device that can be configured according to some embodiments.

For example, referring to FIG. 10D, an EGM 100' may be implemented as a handheld device including a compact housing 105 on which is mounted a touchscreen display device 116 including a digitizer 152. An input button 130 may be provided on the housing and may act as a power or control button. A camera 127 may be provided in a front face of the housing 105. The housing 105 may include one or more speakers 150. In the EGM 100', various input buttons described above, such as the cashout button, gameplay activation button, etc., may be implemented as soft buttons on the touchscreen display device 116. Moreover, the EGM 100' may omit certain features, such as a bill acceptor, a ticket generator, a coin acceptor or dispenser, a card reader, secondary displays, a bet display, a credit display, etc. Credits can be deposited in or transferred from the EGM 100' electronically.

Figure 10E:
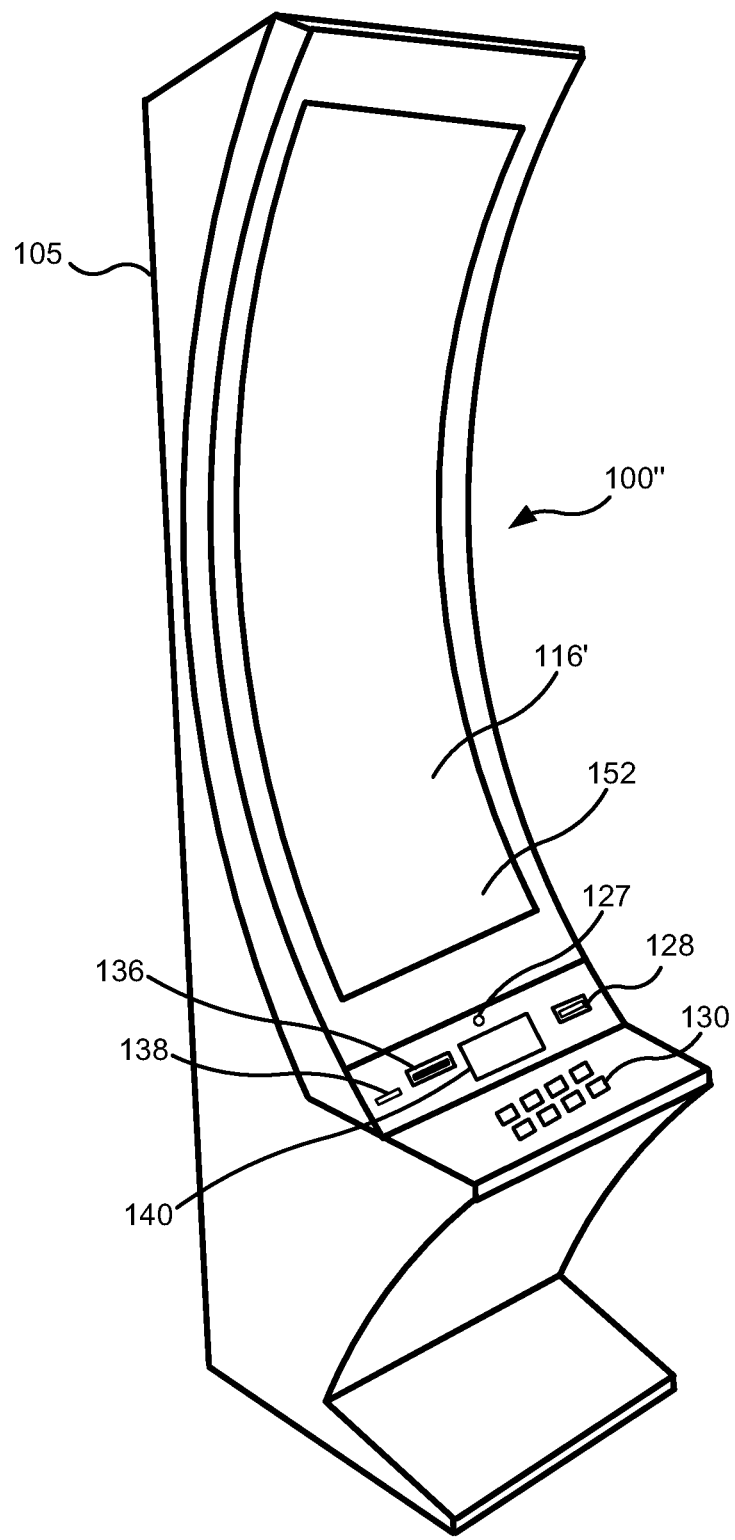
FIG. 10E is a perspective view of an electronic gaming device according to further embodiments.
Figure 11:
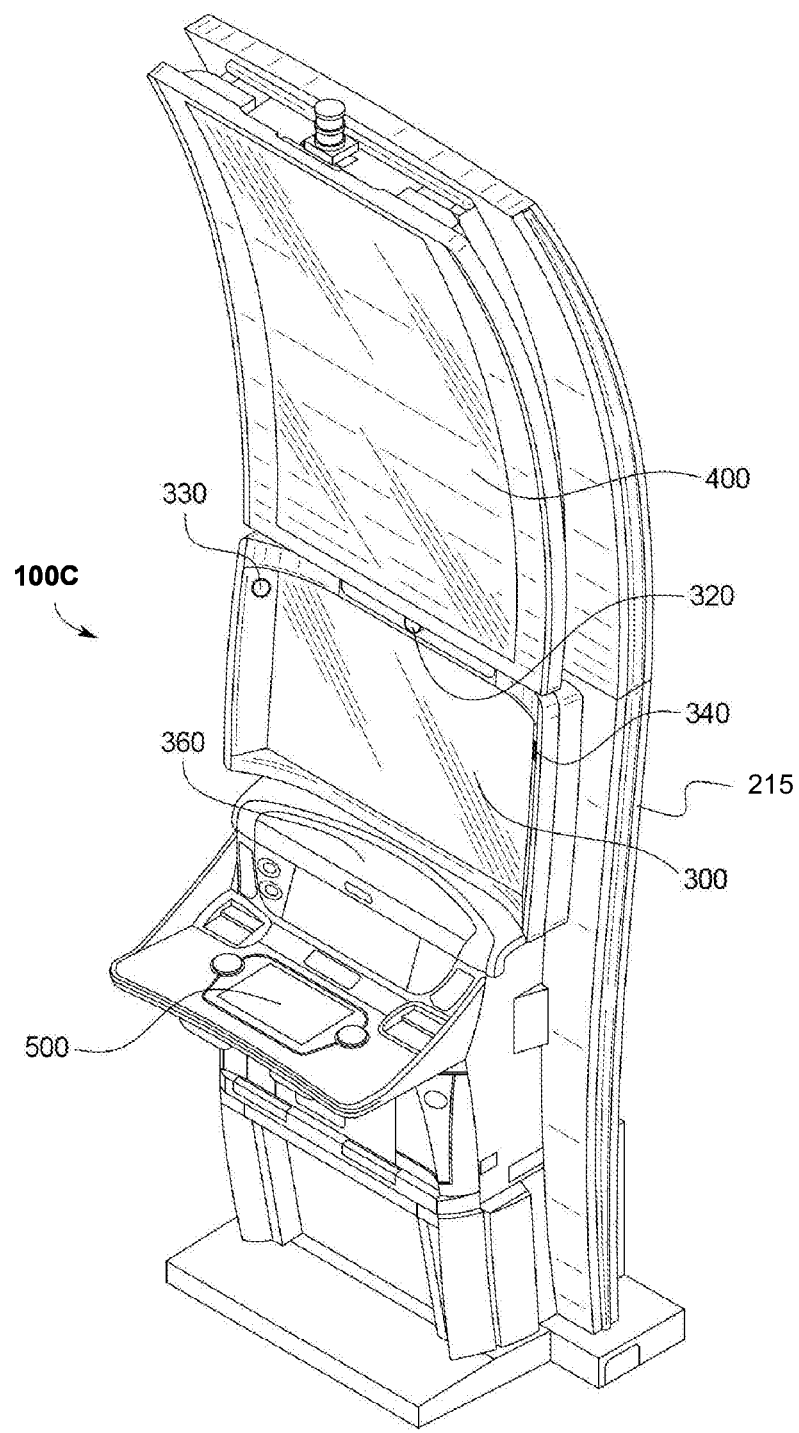
FIG. 11 is a front perspective view of an EGM according to further embodiments.
Figure 12:
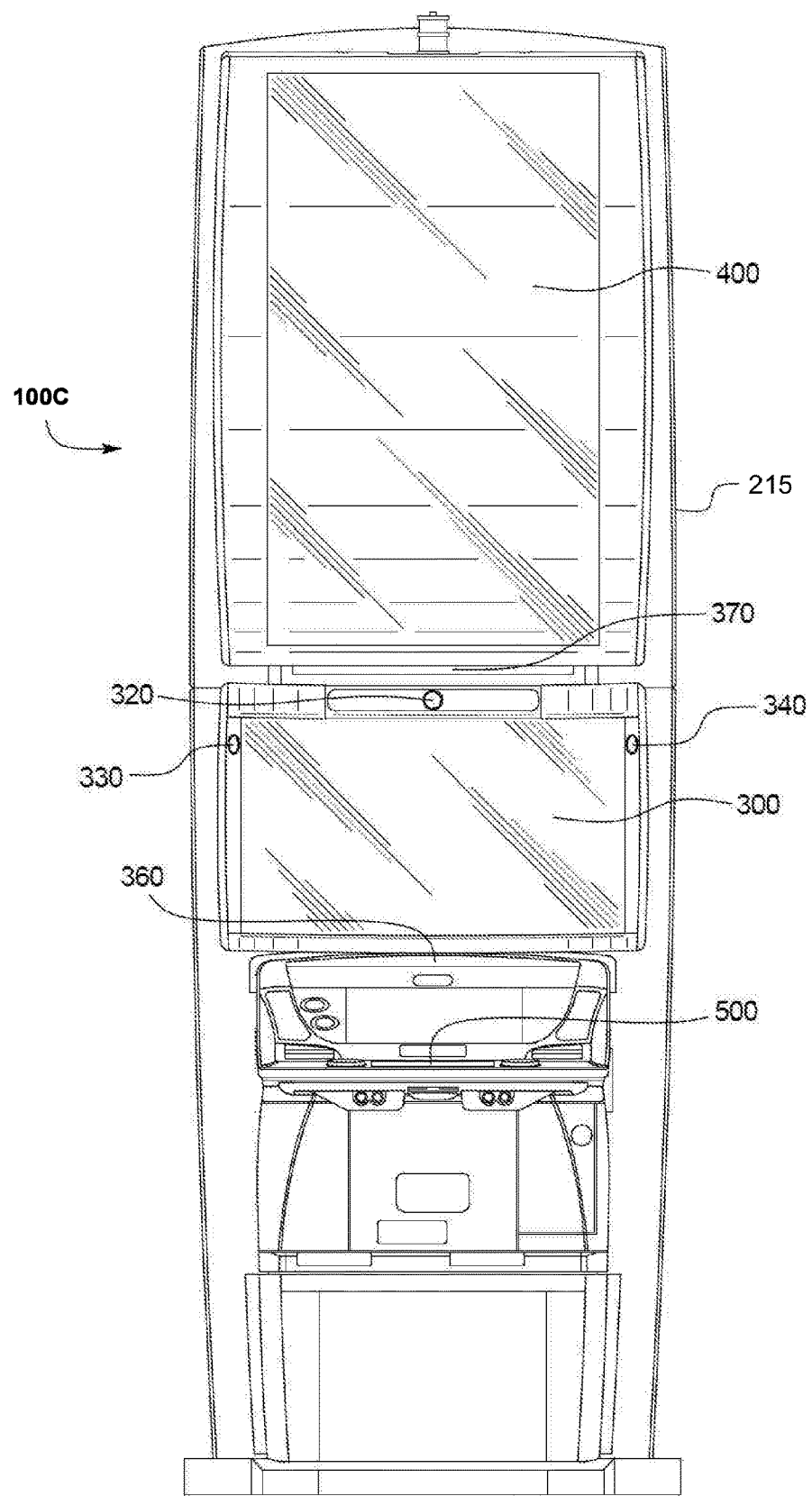
FIG. 12 is a front view of the EGM of FIG. 11.
Figure 13A:
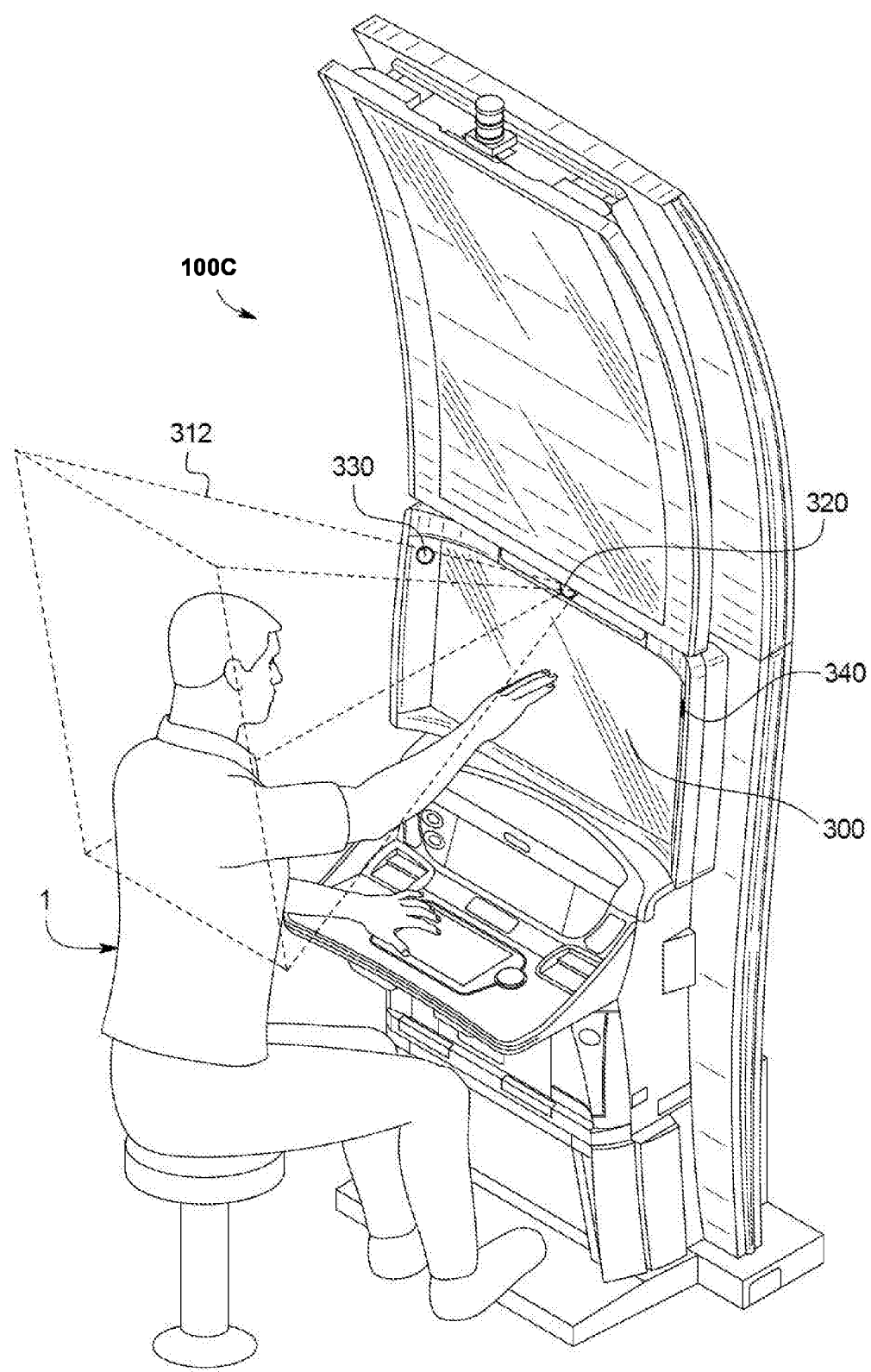
FIG. 13A is a front perspective view of the EGM of FIG. 11.
Figure 13B:
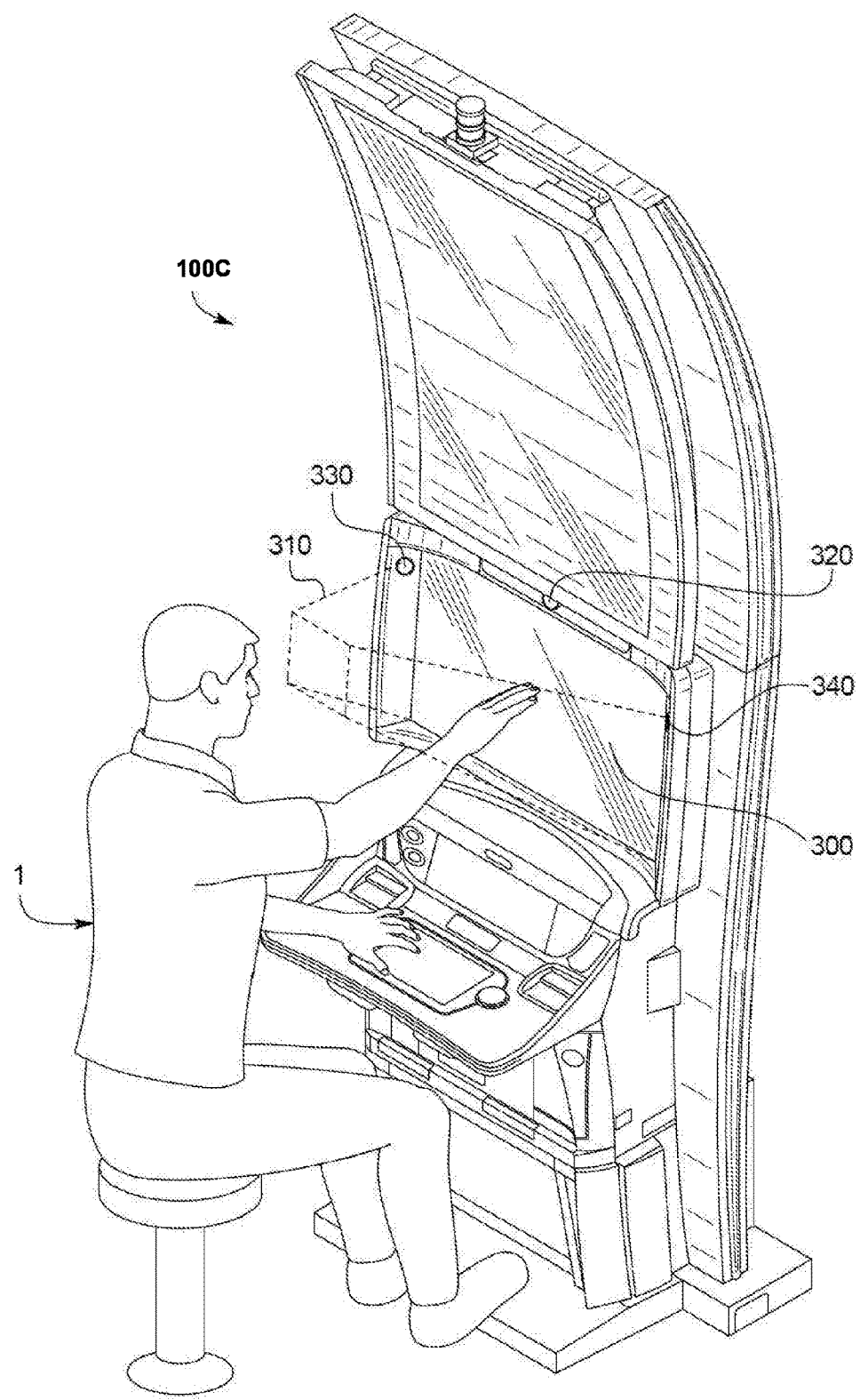
FIG. 13B is a front perspective view of the EGM of FIG. 11.
Figure 13C:
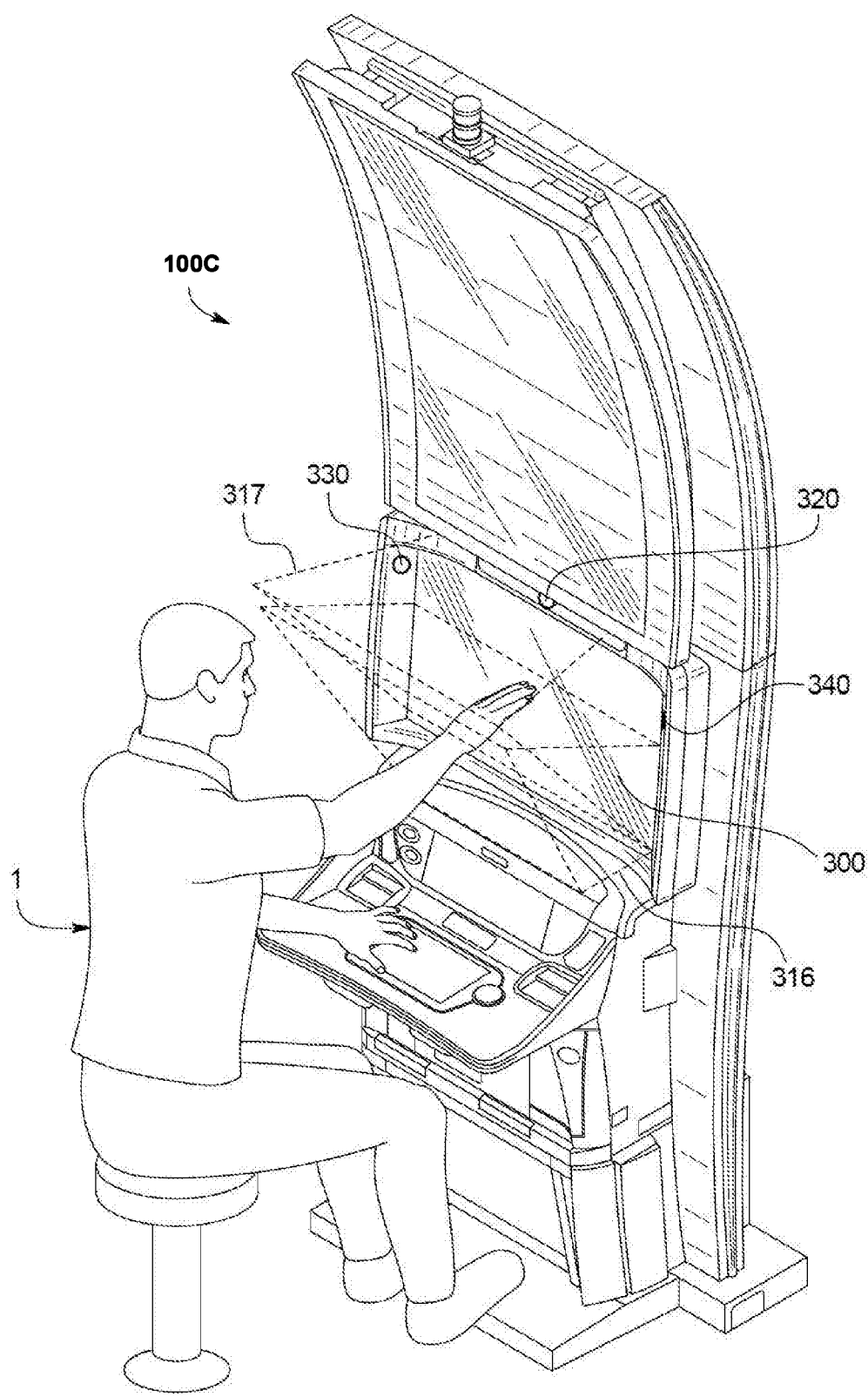
FIG. 13C is a front perspective view of the EGM of FIG. 11.
Figure 13D:
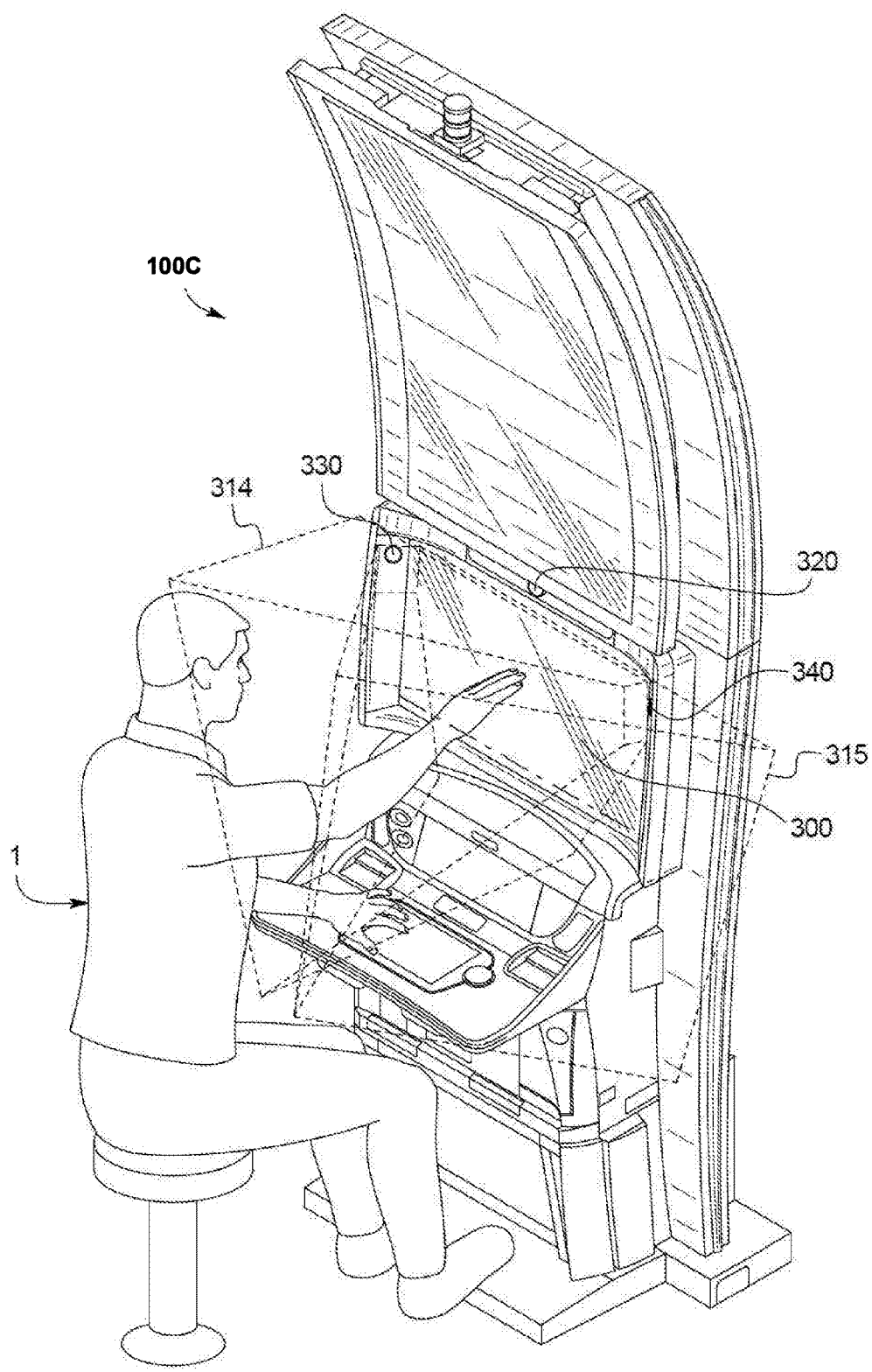
FIG. 13D is a front perspective view of the EGM of FIG. 11.

FIG. 10E illustrates a standalone EGM 100" having a different form factor from the EGM 100 illustrated in FIG. 10A. In particular, the EGM 100" is characterized by having a large, high aspect ratio, curved primary display device 116' provided in the housing 105, with no secondary display device. The primary display device 116' may include a digitizer 152 to allow touchscreen interaction with the primary display device 116'. The EGM 100" may further include a player tracking display 140, a plurality of input buttons 130, a bill/ticket acceptor 128, a card reader 138, and a ticket generator 136. The EGM 100" may further include one or more cameras 127 to enable facial recognition and/or motion tracking.

Player Tracking

In various embodiments, the gaming system includes one or more player tracking systems under control of the player tracking module 20B shown in FIG. 10C. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

As noted above, a player's progress or status can be saved in other ways besides using a player tracking system, such as by generating, when the player cashes out, a ticket including a printed code, such as a bar code or QR code, that identifies the player's session. When the player wants to continue the game, the player may insert the ticket including the printed code into the bill/ticket acceptor 128 of an EGM 100 (which may or may not be the same EGM 100 from which the ticket was issued). The EGM 100 reads the printed code and retrieves the player's status in response to the printed code.

Contactless Haptic Feedback

Some embodiments may incorporate contactless (i.e., mid-air) haptic feedback to the player in conjunction with a mixed reality viewing interface to provide a more interactive virtual experience to the player. Systems and methods for providing contactless haptic feedback are disclosed, for example, in U.S. Provisional Patent Application Ser. No. 62/398,272, entitled "ELECTRONIC GAMING MACHINE AND METHOD PROVIDING ENHANCED PHYSICAL PLAYER INTERACTION," filed Sep. 22, 2016, the disclosure of which is incorporated herein by reference as if set forth in its entirety.

Accordingly, an EGM 100 according to some embodiments may include a player hand position locator and a player tactile feedback provider configured to provide tactile feedback to at least one of the player's hands in the player interaction zone based on the determined position(s) of the player's hand(s). In various embodiments of the present disclosure, the EGM 100 further includes at least one input device, at least one processor, and at least one memory device that stores a plurality of instructions that, when executed by the at least one processor, cause the at least one processor to operate with the player hand position locator and the player tactile feedback provider to provide one or more plays of primary and/or bonus games (or other functionality) with enhanced physical player interaction. In these embodiments, the EGM 100 can use the player tactile feedback provider to produce one or more sensations in the player's hand(s) in the player interaction zone at the position(s) of the player's hand(s) determined by the player hand position locator on a real time or substantially real time basis to give the player the sensation that the player is actually touching or feeling or interacting with a physical object in the player interaction zone in front of the player (or otherwise physically interacting with the display device or EGM).

More specifically, in various embodiments of the present disclosure, the EGM includes a player hand position locator including cameras positioned to the right and left of the EGM and configured to track or determine one or more positions of at least one of the player's hands in front of the display device, and a player tactile feedback provider including ultrasonic transducers or transducer arrays positioned above and below the display device and configured to provide tactile feedback to at least one of the player's hand based on the determined position(s) of the player's hand(s). In various such embodiments of the present disclosure, the EGM further includes at least one processor, and at least one memory device that stores a plurality of instructions that, when executed by the at least one processor, cause the at least one processor to operate with the player hand position locator, the player tactile feedback provider, and the at least one input device to provide one or more plays of primary or bonus games (or other functionality) with enhanced physical player interaction. In these embodiments, the EGM can use the ultrasonic transducers or transducer arrays to produce one or more sound waves that cause sensations in the player's hand(s) in the player interaction zone at the position(s) of the player's hand(s) determined by the cameras positioned to the right and left of the display device on a real time or substantially real time basis to give the player the sensation(s) that the player is actually touching or feeling or interacting with a physical object in the player interaction zone in front of the player (or otherwise physically interacting with the display device).

In various embodiments of the present disclosure, the EGM can provide the enhanced physical player interaction in conjunction with one or more various game components (such as but not limited to game symbols, game cards, game reels, game wheels, game tiles, game dice, game chips, game balls, game selections, game characters, game awards, game outcomes, or other game objects) or other functional aspects or functionality provided by the EGM to or for the player.

Referring now to FIGS. 11, 12, 13A, 13B, 13C, and 13D, one example EGM of the present disclosure is generally illustrated and indicated by numeral 100. This example EGM 100C illustrated in FIGS. 11, 12, 13A, 13B, 13C, and 13D generally includes a support structure or cabinet 215 that supports a plurality of output devices and a plurality of input devices of the EGM 100C, among other components. In this illustrated example embodiment, the plurality of output devices includes: (a) a first or intermediate display device 300; (b) a second or upper display device 400 positioned above the first or intermediate display device 300; and (c) a third or lower display device 500 positioned below the first or intermediate display device 300. These output devices are configured to display the games, game outcomes, awards (such as the primary and secondary games awards or other game outcome awards), and other functionality and information to the player. In this illustrated example embodiment, the plurality of player input devices enable the player to play one or more wagering games provided by the EGM. Such player input devices can also include one or more of the input devices described below in the second section of this detailed description. These player input devices are physically touchable or activatable by the player to enable the player to make inputs into the EGM. These output devices and input devices are configured such that a player may operate the EGM while standing or sitting, but preferably operates the EGM while the player is sitting in front of the EGM 100C such that the player's head is approximately at the same height as the first display device 300 (as generally shown in FIGS. 13A, 13B, 13C, and 13D).

In various embodiments of the present disclosure, the EGM of the present disclosure includes: (a) the first display device; (b) a player eye or head tracker configured to track the movement of the eyes and/or head of the player; (c) a player hand position locator configured to track the position(s) of at least one of the player's hands in a player interaction zone in front of the first display device; (d) a player tactile feedback provider configured to provide tactile feedback to at least one of the player's hands in the player interaction zone; and (e) one or more processors and memory devices that co-act or work together with the above mentioned components to provide the enhanced physical player interaction with the EGM. The player may view the EGM and associated virtual 3D content using an MR viewer 200 as described above, and the player tactile feedback may be provided to the player as the player interacts with virtual objects displayed to the player using the MR viewer 200.

It should be appreciated that: (a) the first display device; (b) the player eye or head tracker; (c) the player hand position locator; and (d) the player tactile feedback provider, may each be individually configured or may alternatively be configured to operate with the one or more processors and memory devices to provide each of their designated functions described herein. In other words, (a) the first display device may be individually configured to display 3D or may be configured to operate with the one or more processors and memory devices to display the 3D images; (b) the player eye or head tracker may be individually configured to track the movement of the eyes and/or head of the player or may be configured to operate with the one or more processors and memory devices to track the movement of the eyes and/or head of the player; (c) the player hand position locator may individually be configured to track the position(s) of at least one of the player's hands or may be configured to operate with the one or more processors and memory devices to track the position(s) of at least one of the player's hands; and (d) the player tactile feedback provider may be individually configured to provide tactile feedback to at least one of the player's hands or may be configured to operate with one or more processors and memory devices to provide tactile feedback to at least one of the player's hands. Thus, for purposes of this disclosure and for brevity, each of these devices are sometimes discussed as performing such tasks individually or operating with the one or more processors and memory devices to perform such tasks, and such descriptions are not intended to limit the present disclosure to either configuration.

In certain embodiments, the first display device, the player eye or head tracker, the player hand position locator, the player tactile feedback provider, the one or more processor(s), and the one or more memory device(s) are configured to provide the enhanced physical player interaction of the present disclosure by operating on a real time or substantially real time basis to: (a) cause the first display device or the MR viewer 200 to display 3D images such that the player in front of the first display can see one or more virtual objects in a player interaction zone in front of the first display device or projecting toward the player; (b) determine movements of the player's eyes or head and cause the first display device to vary the display relating to the virtual object(s) in the player interaction zone based on such player eye or head movements; (c) determine the positions of one or more of the player's hands positioned in the player interaction zone in front of the display device; (d) determine or estimate the position(s) of the player's hand(s) relative to the apparent positions of the virtual objects displayed in the player interaction zone; and (e) enable the player to interact with the virtual objects in the player interaction zone in part by changing the display of the objects based on the position(s) of the player's hand(s) and in part based on causing a physical interaction with the player's hand(s) to occur in the player interaction zone at the position(s) of the virtual object(s), thus giving the player a sense that the player actually touched one or more of the virtual objects as if the virtual object(s) were physical objects floating in the player interaction zone. In various embodiments, this physical interaction is provided by one or more choreographed haptic events that the player can physically feel or sense on the player's hand(s) or finger(s). In various embodiments, the choreographed haptic event(s) include one or more sound waves directed at the player's hand(s) or finger(s) that provide the player a feeling or sensation that the player is actually touching the virtual object in the player interaction zone or otherwise interacting with the EGM without actually touching the EGM.

In various embodiments, the MR viewer 200 is configured to display or project what appears to the player as one or more 3D virtual objects that are projected towards the player or projected in the player interaction zone (such as the player interaction zone 310 shown in FIG. 13B) in front of the player 1. In various embodiments, the MR viewer 200 is configured to display or project what appears to the player as one or more 3D virtual objects that appear to the player to be behind the front face or screen of the display device.

In this illustrated embodiment, the player interaction zone 310 extends in front of the display device 300 in somewhat of a cone shape. However, it should be appreciated that in other embodiments, the player interaction zone can be alternatively configured, such as to extend: (a) from a horizontal plane level with a top edge of the display device to a horizontal plane level with a bottom edge of the display device; (b) from a vertical plane level with a right side edge of the display device to a vertical plane level with a left side edge of the display device; and (c) from a vertical plane from a front face of the display device to a vertical plane approximately twelve inches from the front surface of the display device. In other embodiments, the player interaction zone can be alternatively configured to extend: (a) from a horizontal plane level with the top edge of the display device to a horizontal plane level with the bottom edge of the display device; (b) from a vertical plane level with the right side edge of the display device to a vertical plane level with the left side edge of the display device; and (c) from a vertical plane from the front face of the display device to vertical plane approximately twelve inches from the front surface of the display device. It should thus be appreciated that the size and shape of the player interaction zone may vary in accordance with the present disclosure.

It should also be appreciated that the size and shape of the player interaction zone may vary as the position of the player's eyes or head change in accordance with the present disclosure. In certain such embodiments, the far end of the cone is centered at the player's eyes or head, and when the player's eyes or head move, the player interaction zone changes.

It should also be appreciated that other suitable 3D or virtual object displaying systems or devices can be employed in accordance with the present disclosure.

In this illustrated example embodiment, the player eye or head tracker of the EGM 100C that is configured to track the movement of the eyes or head of the player includes one or more eye tracking or head tracking cameras such as eye tracking or head tracking camera 320 supported by the cabinet 215 and positioned directly above the display device 300. The eye tracking or head tracking camera 320 is configured to track the position of the player's eyes or the player's head as they move in front of the display device 300. More specifically, the eye tracking or head tracking camera 320 is configured to track the position of the player's eyes or the player's head as they move in an eye/head tracking zone such as the eye/head tracking zone 312 shown in front of the EGM 100C in FIG. 13A. In the embodiments where two or more eye tracking or head tracking cameras are employed, such multiple cameras work together to track the position of the player's eyes or the player's head as they move in front of the display device 300. In various embodiments, such multiple cameras are spaced apart, such as spaced apart 6 inches.

In various embodiments, the processor(s), memory device(s), the player eye or head tracker, and the display device of the EGM 100C align the coordinate system of the virtual display area (or world) with the real world by using the head position information obtained from the player eye or head tracker. When the player moves his head around, the display device of the EGM 100C causes the virtual object(s) to appear to the player to stay in place where it is. Therefore, the EGM 100C uses the head position to fix the object(s) in space. The actual 2D stereo projection by the display device changes according to the head position, but to the player, the virtual object(s) appears or seems to stay where it is.

It should be appreciated that the location of the eye/head tracking zone may vary in accordance with the present disclosure. It should be appreciated that the eye/head tracking zone may vary in accordance with the present disclosure based on the configuration and position of the eye tracking or head tracking camera. It should also be appreciated that more than one eye tracking or head tracking cameras may be employed in the EGM in accordance with the present disclosure. It should further be appreciated that the one or more eye tracking or head tracking cameras may be employed in the EGM in different positions adjacent to the display device or elsewhere on the EGM in accordance with the present disclosure. It should also be appreciated from the above and from FIG. 13B that in certain embodiments of the present disclosure, the player's head (and eyes) are expected to be outside of the player interaction zone 310.

The first display device 300, the eye tracking or head tracking camera 320, the one or more processor(s), and the one or more memory device(s) co-act or operate to track the player's eyes or head movements in the eye/head tracking zone 312 in relation to the first display device 300 and the player interaction zone 310 and to adjust the display or projection of each of the virtual object(s) in the player interaction zone 310 based on the player's eye or head movements. In various embodiments, the first display device 300 adjusts the image(s) to be seen by the player's left and right eyes based on the determined position(s) and movement(s) of the player's eyes or head.

The lenticular lense(s) facilitate the perception of two different images for the left and right eye of the player. In other words, the lenticular lense(s) cause certain pixels of the screen to be visible only to the player's right eye and certain other pixels of the screen to be visible only to the left eye of the player. When the player's head position is changed, the display device also changes the pixel positions for the left eye and the right eye of the player. The head position or changes thereto determined by the eye or head tracker are used by the EGM to choose or select the correct pixels for the left eye and the right eye of the player.

It should also be appreciated that other suitable eye tracking or head tracking systems or devices can be employed in accordance with the present disclosure.

In this illustrated example embodiment, the player hand position locator of the EGM 100C that is configured to track or determine the position(s) of at least one of the player's hands in front of the first display device 300 in the right and left player hand tracking zones 314 and 315 (shown in FIG. 13D) includes a plurality of cameras 330 and 340 supported by the cabinet 215 and positioned adjacent to the first display device 100. In this illustrated embodiment, one camera 330 is positioned directly to the right of the display device 300 (looking forward) and one camera 340 positioned directly to the left of the display device 300 (looking forward). In this illustrated embodiment, the plurality of cameras 330 and 340 are positioned adjacent to an upper right hand corner of the display device 300 and the other of the plurality of camera is positioned adjacent to an upper left hand corner of the display device 300. It should be appreciated that in an alternative embodiment, the plurality of cameras can be positioned adjacent to a lower right hand corner of the display device 300 and positioned adjacent to a lower left hand corner of the display device 300. It should be appreciated that in other alternative embodiments, the plurality of cameras can be otherwise alternatively positioned in accordance with the present disclosure. It should also be appreciated that in other alternative embodiments, the EGM can include only one such camera or more than two such cameras in accordance with the present disclosure. In various embodiments, the player hand position locator is configured to locate part of the player's hand, such as one or more fingers. In various embodiments, the player hand position locator is configured to simultaneously locate both of the player's hands or locate multiple parts of the player's hands, such as two or more fingers.

In various embodiments, the cameras 330 and 340 are or include time of flight depth camera sensors positioned at the two opposite sides of the display device 300 and focused inwardly somewhat towards each other. This configuration enables the cameras 330 and 340 to track objects, such as one or more of the player's hands in the relatively large right and left player hand tracking zones 314 and 315 (shown in FIG. 13D), respectively. These right and left player hand tracking zones 314 and 315 overlap the player interaction zone 310 (shown in FIG. 13B). In various embodiments, the time of flight depth camera sensors make the EGM less prone to occlusions. In various embodiments, the time of flight depth cameras also deliver point clouds that can be quickly analyzed and used by the processor(s) to make the necessary determinations. It should be appreciated that other suitable depth sensors (other than time of flight sensors) may be employed in accordance with the present disclosure.

In various embodiments, the EGM 100C uses the image data provided by the cameras 330 and 340 to determine the position(s) of the player's hand(s) in the right and left player hand tracking zones 314 and 315 and thus also in the player interaction zone 310. In certain embodiments, the EGM 100C creates the object depth images using point clouds provided by time of flight depth cameras and merges these point clouds to create one optimized point cloud that represents the object(s), such as the player's hand(s) in the right and left player hand tracking zones 314 and 315, and thus any portions thereof also in the player interaction zone 310 and relative to the display device 300. This provides a high degree of accuracy and a relatively large coverage area and player interaction zone (then would a one camera system). In these embodiments, the EGM determines in real time or substantially real time the position(s) of the object(s) such as the player's hand(s) in the player interaction zone 310, and uses the determined position(s) for providing the player haptic or tactile feedback to the player in real time or substantially real time.

Using these two cameras and keeping the camera resolution relatively low: (a) facilitates an increased size of the player interaction zone; and (b) reduces the need for high data rates and significant processing time or delays for image analysis that may slow down the EGM and prevent real time or substantially real time physical player feedback or sensation. Using these two cameras also better facilitates the tracking of multiple player hands.

In various other embodiments, the EGM uses the image data provided by the cameras 330 and 340 to determine the closest depth of the end of the player's hand(s) such as the end of one of the player's fingers that is in the player interaction zone 310 closest to the display device 300. In other words, in these alternative embodiments, the EGM determines the nearest point (i.e., the xyz coordinate relative to the display device 300) of the object such as the player's hand to the display device 300, and then uses that point as the reference for providing the tactile feedback to the player in real time or substantially real time.

In various other embodiments, the EGM uses the image data provided by the cameras 330 and 340 to determine movements or gestures by the player's hand(s). In these embodiments, the EGM uses the determined gestures to provide the player tactile feedback to the player in real time or substantially real time.

In certain embodiments, the EGM includes one or more camera sync cables (not shown) that sync the multiple cameras 330 and 340 to enhance the accuracy of the determination of the position(s) of player's hand(s) in the right and left player hand tracking zones 314 and 315 and in the player interaction zone 310. It should be appreciated that the image data from the multiple cameras can be synced in other suitable manners in accordance with the present disclosure.

It should also be appreciated that other suitable player hand position locating systems or devices can be employed in accordance with the present disclosure.

For example, in various embodiments, the player hand position locator actually estimates the hand pose. The pose of the hand is not the position of the hand, but is instead the location and orientation of certain or every bone of the hand. In certain embodiments, the hand pose is determined by determining or specifying the 3D coordinates of a plurality of or every joint of the skeleton hand.

In this illustrated example embodiment, the player tactile feedback provider of the EGM 100C that is configured to provide tactile feedback to at least one of the player's hands includes a plurality of ultrasonic transducers or two arrays of ultrasonic transducers 360 and 370 supported by the cabinet 215 and positioned directly below and above the first display device 300, respectively. These ultrasonic transducers or ultrasonic transducer arrays 360 and 370 are configured to selectively produce and direct sound waves into lower and upper haptic zones 316 and 317 shown in FIG. 13C and in the player interaction zone 310 from below and above the first display device 300. The EGM 100C uses the ultrasonic transducers or ultrasonic transducer arrays 360 and 370 to produce and send the directed sound waves into the player interaction zone 310 at the determined position(s) of the player's hand(s) to cause the players' hand(s) to feel or sense one or more pulses or the sound waves produced by such devices on a real time or substantially real time basis.

In various embodiments, the EGM 100C uses the ultrasonic transducers or ultrasonic transducer arrays 360 and 370 to produce and send the directed sound waves into the player interaction zone 310 at the determined position(s) of the player's hand(s) when the player's hand(s) are at the same positions of one or more of the displayed virtual objects in the player interaction zone 310 such that the sound waves reaching the player's hand(s) at the positions provide the player the sensation that the player is actually touching, feeling, or interacting with one or more of the displayed virtual objects as if each such object was an actual physical object floating in the player interaction zone 310 in front of the player. This player sensation can occur when the player interacts with virtual object(s) apparently in midair in the player interaction zone 310. Thus, the EGM 100C can simulate a characteristic of one or more of the virtual objects the player appears to be interacting with. This provides one of the many different enhanced physical player interactions that can be provided by the EGM 100C in accordance with the present disclosure.

In various embodiments, the EGM 100C can cause the ultrasonic transducers or ultrasonic transducer arrays 360 and 370 to individually or jointly produce and send continuous, regular, interrupted, directed, or individual sound waves into the areas of the player interaction zone 310 at the determined positions of the player's hand(s) to cause the players' hand(s) to feel such sound waves. In various embodiments, the EGM 100C can cause the ultrasonic transducers or ultrasonic transducer arrays 360 and 370 to vary the intensity of the sound waves into the areas of the player interaction zone 310 at the determined positions of the player's hand(s) to cause the players' hand(s) to feel different sensations.

The EGM 100C can cause the ultrasonic transducers or ultrasonic transducer arrays 360 and 370 to produce and send such different sound waves or sound wave patterns directed to: (a) the positions in the player interaction zone 310 where the player's hand(s) is closest to the display device 300; (b) the positions in the player interaction zone 310 which are where the entire player's hand(s) are at; (c) the positions in the player interaction zone 310 which are where the player's arm(s) is or are at; or (d) any combination of these positions in the player interaction zone 310.

In various embodiments, at the same time or slightly after the EGM creates the physical interaction with the player's hand(s) in the player interaction zone 310, the EGM can cause the display device 300 to alter the image(s) including the virtual object(s) in the player interaction zone 310. This can be used to show one or more responses of the virtual object(s) or other displayed image(s) to the interaction with the player's hand(s).

Thus, in various embodiments, the EGM captures the player's hand(s) or finger(s) midair location coordinates while performing a movement in the player interaction zone 310 in real-time, provides haptic sensation to the player's hand(s) or finger(s) at these coordinates in the player interaction zone 310 with no or little lag time, and can additionally alter the displayed virtual object(s) in real time.

In various embodiments, the EGM maps one or more of the player's hand(s) into the virtual environment displayed by the display device 300 and/or into the player interaction zone 310. In certain such embodiments, the display device 300 can display part of one or more of the player's hand(s) on the display device 300 or as a virtual object to further enhance the player interaction.

In the illustrated example embodiment of the EGM 100C of the present disclosure shown in FIGS. 11 to 13D, the cameras 330 and 340 of the player hand position locator of the EGM 100C are positioned directly to the right and left of first display device 300, and the ultrasonic transducers or ultrasonic transducer arrays 360 and 370 are positioned directly below and above the first display device 300. It should be appreciated that in an alternative embodiment of the present disclosure, the cameras 330 and 340 of the player hand position locator of the EGM 100C are positioned directly below and above the first display device 300, and the ultrasonic transducers or ultrasonic transducers arrays 360 and 370 are positioned directly to the right and left of the first display device 300. It should further be appreciated that in an alternative embodiment of the present disclosure, the cameras of the player hand position locator of the EGM are positioned directly below and above the first display device, and the ultrasonic transducers or ultrasonic transducer arrays are also positioned directly below and above the first display device. It should further be appreciated that in an alternative embodiment of the present disclosure, the cameras of the player hand position locator of the EGM are positioned directly to the right and left of the first display device, and the ultrasonic transducers or ultrasonic transducer arrays are positioned directly to the right and left of the first display device. It should further be appreciated that in alternative embodiments of the present disclosure, the ultrasonic transducers or ultrasonic transducer arrays are positioned directly to the right and left of the first display device and directly above and below the first display device or suitable combinations thereof.

In the illustrated example embodiment, the processor(s) and memory device(s) of the EGM 100C co-act or work together to provide the enhanced physical player interaction with the EGM 100C and incorporate the player's hand(s) into one or more of the games provided by the EGM 100C or other functionality provided by the EGM 100C. For example, the displayed or projected virtual object(s) can be part of a game that enables or requires the player to interact with the object(s) as part of the play of the game.

It should be appreciated that the player tactile feedback provider can in alternative embodiments provide feedback to the player's hand(s) outside of the player interaction zone in accordance with the present disclosure, but in certain such embodiments, the player would not see virtual objects outside of such player interaction zone.

It should also be appreciated that certain other suitable player tactile feedback providing systems or devices can be employed in accordance with the present disclosure.

It should be appreciated from the above that in various embodiments, the EGM can provide the enhanced physical player interaction in conjunction with game play or other functionality provided by the EGM to the player. For example, the EGM can provide interaction with: (a) one or more fingertips of the player interacting in midair in the player interaction zone that enables the player to make inputs such as drawing letters, symbols, or other images with controlled sensational feedback; or (b) one hand or two hands of the player interacting in midair in the player interaction zone the player to make inputs such as drawing letters, symbols, or other images with controlled sensational feedback.

In various embodiments, the EGM can provide the enhanced physical player interaction in conjunction with other functionality provided by the EGM to the player. For example, the EGM can display virtual images of a series of drinks in the player interaction zone and enable to player to select one of the virtual images. When the player positions the player's hand at the position of the selected drink, the EGM can use the ultrasonic transducers or ultrasonic transducer arrays to provide feedback or sensation to the player's hand indicating that that drink has been selected by the player.

In various embodiments, the EGM includes one or more audible sound producing devices (such as speakers) that produce sounds that are coordinated with the haptic tactile feedback provided to the player by the EGM to further enhance the physical player interaction in conjunction with game player or other functionality provided by the EGM to the player.

In various embodiments, a sound chair is associated with the EGM and includes one or more audible sound producing devices (such as speakers) that produce sounds that are coordinated with the haptic tactile feedback provided to the player by the EGM to further enhance the physical player interaction in conjunction with game player or other functionality provided by the EGM to the player.

Figure 14A:
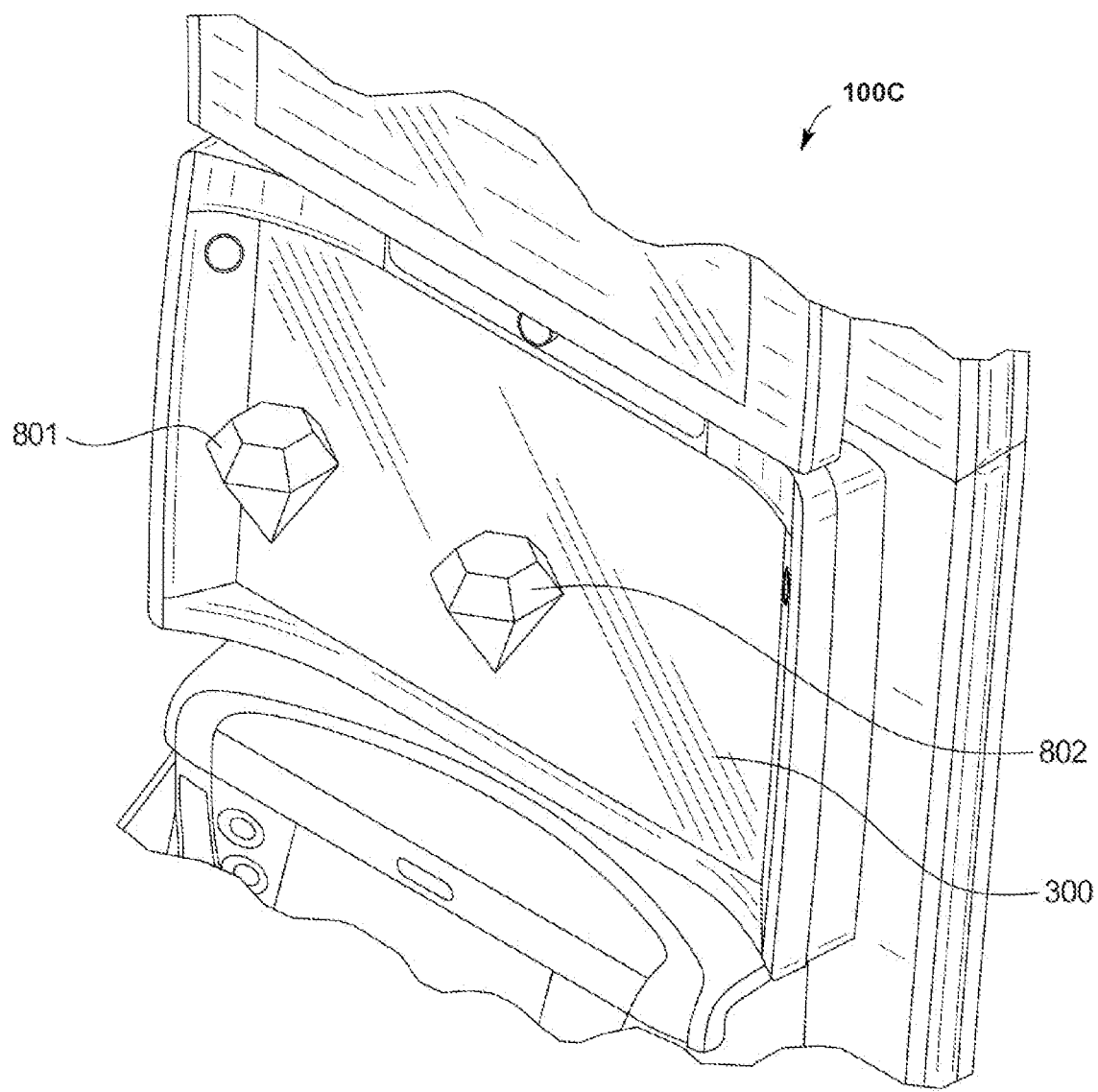
FIG. 14A is an enlarged fragmentary front perspective view of the central portion of the EGM of FIG. 11.
Figure 14B:
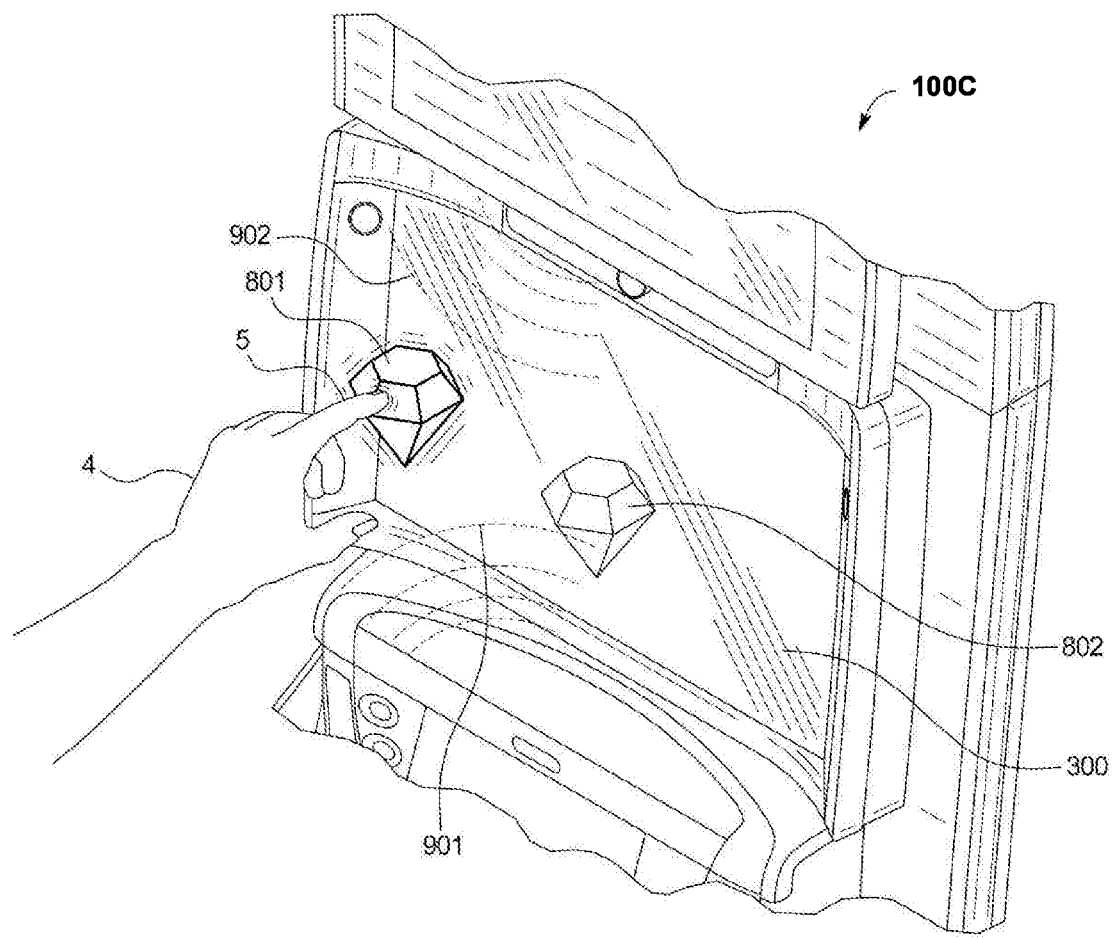
FIG. 14B is an enlarged fragmentary front perspective view of the central portion of the EGM of FIG. 11.

FIGS. 14A and 14B illustrate one example operation of the EGM 100C of one embodiment of the present disclosure. FIG. 14A shows the EGM 100C displaying in 3D two player selectable virtual objects 801 and 802 in the player interaction zone in front of the display device 300 prior to a player hand touching one of the virtual objects. Of course, it should be appreciated that these objects 801 and 802 are not real, but rather what a player would see looking at the first display device 300. FIG. 14B shows the EGM displaying in 3D the two virtual objects 801 and 802 in front of the display device 100, a player hand 4 and particularly a player finger 5 touching one of the virtual objects 801 that is selected by the player, and the player hand 4 being subject to sound waves 901 and 902 shown in phantom that cause the player to feel one or more sensations of the player touching the object 801. Of course, it should be appreciated that these objects 801 and 802 are not real, but rather what a player would see looking at the first display device 300, and that this shows that at the point in time when it appears to the player that the player is touching the object 801, the player's hand 4 and particularly the player's finger 5 is subjected to the sound waves 901 and 902 that cause one or more sensations in the player hand 4 and particularly the player's finger 5. This example is an example of how the EGM 100C can be used to provide a selection game such as a bonus selection game where the player selects one or more virtual objects to obtain awards. In various embodiments, the touching of the virtual object causes the appearance of the virtual object(s) to move or otherwise change as indicated by the lines indicating the movement of object 801 when "touched" by the player finger 5.

Other EGM Features

Embodiments described herein may be implemented in various configurations for EGMs 100s, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to a EGM local processor and memory devices. In such a "thick client" embodiment, the EGM local processor executes the communicated computerized instructions to control any games (or other suitable interfaces) provided to a player.

In some embodiments, an EGM may be operated by a mobile device, such as a mobile telephone, tablet other mobile computing device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of interacting with an electronic gaming machine that executes a program for a wagering game, the method comprising:
   generating a video image comprising an image of the electronic gaming machine from an image point of view corresponding to a player point of view of a player's view of the electronic gaming machine;
   generating virtual game content associated with the wagering game executed by the electronic gaming machine based in part on the video image, wherein the virtual game content is generated separately from the video image;
   displaying the virtual game content to the player on a mixed reality viewing device within the view of the player to augment the player's view of the electronic gaming machine, wherein the virtual game content comprises a virtual avatar that appears to the player to interact with a game action of the wagering game being displayed on a primary display screen of the electronic gaming machine to affect an outcome of the wagering game;
   generating two dimensional game content corresponding to the game action being displayed on the primary display screen and two-dimensional virtual game content corresponding to the virtual game content being viewed by the player; and
   displaying, by a secondary display screen of the electronic gaming machine, the two dimensional game content and the two-dimensional virtual game content, wherein the secondary display screen is separated from the primary display screen, and wherein the two dimensional virtual game content does not appear to the player to be on the two-dimensional virtual game content.

2. The method of claim 1, further comprising:
   displaying a first reel on the primary display screen, wherein the first reel comprises a first game element of the wagering game, and wherein the virtual game content comprises a second reel that comprises a second game element of the wagering game;
   determining the outcome of the wagering game based on the first game element and the second game element; and
   awarding a prize to the player based on the outcome of the wagering game.

3. The method of claim 1, wherein the wagering game comprises a base wagering game, the method further comprising:
   displaying game elements of the base wagering game on the primary display screen;
   determining an outcome of the base wagering game;
   presenting a bonus game to the player in response to the outcome of the base wagering game, wherein the virtual game content comprises a bonus game element of the bonus game; and
   determining an outcome of the bonus game based in part on the bonus game element.

4. The method of claim 3, wherein the game elements of the base wagering game comprise two dimensional content, and wherein bonus game element of the virtual game content comprises three dimensional content.

5. The method of claim 1, wherein the game action further comprises spinning of a mechanical reel so that the mechanical reel comes to rest at a first location, and wherein the virtual avatar interacts with the game action to affect the outcome by nudging the mechanical reel to a second location after the mechanical reel has come to rest at the first location,
   wherein the virtual avatar nudging the mechanical reel further comprises causing the electronic gaming machine to electromechanically move the mechanical reel from the first location to the second location.

6. The method of claim 1, further comprising:
   receiving a voice command from the player, wherein the virtual avatar appears to the player to interact with the game action of the wagering game in response to the voice command.

7. The method of claim 6, further comprising causing, by the electronic gaming machine, the virtual avatar to appear to the player to carry out the voice command.

8. The method of claim 1, wherein the mixed reality viewing device comprises a first mixed reality viewing device, the method further comprising displaying the virtual game content to an observer of the wagering game on a second mixed reality viewing device operated by the observer simultaneously with displaying the virtual game content to the player on the first mixed reality viewing device.

9. The method of claim 1, wherein the mixed reality viewing device comprises a first mixed reality viewing device, and
   wherein the virtual game content comprises first virtual game content, the method further comprising:
   displaying second virtual game content that is different from the first virtual game content to an observer of the wagering game on a second mixed reality viewing device operated by the observer simultaneously with displaying the virtual game content to the player on the first mixed reality viewing device.

10. The method of claim 1, further comprising:
    receiving a voice command from the player; and
    displaying the virtual game content in response to the voice command.

11. An electronic gaming system, comprising:
a processor circuit; and
a memory storing computer program instructions that, when executed by the processor circuit, cause the processor circuit to:
generate a video image comprising an image of an electronic gaming machine, wherein the electronic gaming machine is within a view of a player of the electronic gaming machine;
execute a game program to display game content of a wagering game on a primary display screen of the electronic gaming machine;
generate virtual game content associated with the game program based in part on the video image; and
cause the virtual game content to be displayed to the player on a mixed reality viewing device being worn by the player to overlay and augment a player point of view of the player's view of the electronic gaming machine, wherein the virtual game content appears to the player to be on or adjacent to the electronic gaming machine;
generate two dimensional game content corresponding to the game content being viewed by the player and two-dimensional virtual game content corresponding to the virtual game content being viewed by the player; and
cause a secondary display screen of the electronic gaming machine to display the two dimensional game content and the two-dimensional virtual game content, wherein the secondary display screen is separated from the primary display screen, and wherein the two dimensional virtual game content does not appear to the player to be on the two-dimensional virtual game content.

12. The electronic gaming system of claim 11, further comprising instructions to:
receive a voice command from the player, wherein the virtual game content comprises a virtual avatar which appears to the player to interact with the wagering game in response to the voice command.

13. The electronic gaming system of claim 11, wherein the mixed reality viewing device comprises a first mixed reality viewing device, the electronic gaming system further comprising instructions to display the virtual game content to an observer of the wagering game on a second mixed reality viewing device operated by the observer simultaneously with displaying the virtual game content to the player on the first mixed reality viewing device.

14. The electronic gaming system of claim 11, wherein the mixed reality viewing device comprises a first mixed reality viewing device, and
wherein the virtual game content comprises first virtual game content, the electronic gaming system of further comprising instructions to:
display second virtual game content that is different from the first virtual game content to an observer of the wagering game on a second mixed reality viewing device operated by the observer simultaneously with displaying the virtual game content to the player on the first mixed reality viewing device.

15. The electronic gaming system of claim 11, further comprising instructions to:
receive a voice command from the player; and
display the virtual game content in response to the voice command.

16. An electronic gaming system, comprising:
an electronic gaming machine comprising a primary display screen, a secondary display screen, a processor circuit and a memory; and
a mixed reality viewing device that is operable by a player of the electronic gaming machine;
wherein the electronic gaming machine comprises a first processor circuit and a first memory storing non-transitory computer program instructions that, when executed by the first processor circuit, cause the first processor circuit to:
generate wagering game content for a wagering game;
generate virtual game content associated with the wagering game based in part on a video image comprising an image of the electronic gaming machine, wherein the electronic gaming machine is within a view of the player of the electronic gaming machine, wherein the wagering game content is generated separately from the virtual game content; and
transmit the virtual game content for display to the mixed reality viewing device;
generate two dimensional game content corresponding to a game action being displayed on the primary display screen and two-dimensional virtual game content corresponding to the virtual game content transmitted to the mixed reality viewing device; and
display, by the secondary display screen, the two dimensional game content and the two-dimensional virtual game content, wherein the two dimensional virtual game content and the two-dimensional virtual game content do not overlap, and
wherein the mixed reality viewing device comprises a second processor circuit and a second memory storing non-transitory computer program instructions that, when executed by the second processor circuit, cause the second processor circuit to:
display the virtual game content to the player to overlay and augment a player point of view of the player's view of the electronic gaming machine, wherein the virtual game content comprises a virtual avatar that appears to the player to interact with a game action of the wagering game to affect an outcome of the wagering game.

17. The electronic gaming system of claim 16, wherein the computer program instructions further cause the processor circuit to:
display a first reel on the primary display screen, wherein the first reel comprises a first game element of the wagering game, and wherein the virtual game content comprises a second reel that comprises a second game element of the wagering game;
determine the outcome of the wagering game based on the first game element and the second game element; and
award a prize to the player based on the outcome of the wagering game.

18. The electronic gaming system of claim 17, wherein displaying the virtual game content further comprises:
displaying the second reel on the mixed reality viewing device with respect to the primary display screen so that the first reel and the second reel appear to be beside each other from the player point of view.

19. The electronic gaming system of claim 16, wherein the game action further comprises spinning of a mechanical reel so that the mechanical reel comes to rest at a first location, and wherein the virtual avatar interacts with the game action to affect the outcome by re-spinning the mechanical reel to a second location after the mechanical reel has come to rest at the first location
  wherein the virtual avatar re-spinning the mechanical reel further comprises causing the electronic gaming machine to electromechanically re-spin the mechanical reel from the first location to the second location.

\* \* \* \* \*